(12) United States Patent
Dong

(10) Patent No.: US 12,469,890 B2
(45) Date of Patent: Nov. 11, 2025

(54) ELECTROCHEMICAL DEVICE, CHARGING DEVICE, CHARGING METHOD, SYSTEM AND ELECTRONIC DEVICE

(71) Applicant: Ningde Amperex Technology Limited, Fujian (CN)

(72) Inventor: Xiaolong Dong, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 876 days.

(21) Appl. No.: 17/710,212

(22) Filed: Mar. 31, 2022

(65) Prior Publication Data

US 2023/0006270 A1 Jan. 5, 2023

Related U.S. Application Data

(63) Continuation of application No. PCT/CN2021/103869, filed on Jun. 30, 2021.

(51) Int. Cl.
*H01M 10/44* (2006.01)
*H01M 50/54* (2021.01)

(52) U.S. Cl.
CPC .......... *H01M 10/44* (2013.01); *H01M 50/54* (2021.01)

(58) Field of Classification Search
CPC ... H01M 10/44; H01M 50/54; H02J 7/007182
USPC ....................................................... 320/137
See application file for complete search history.

(56) References Cited

U.S. PATENT DOCUMENTS

| | | | | |
|---|---|---|---|---|
| 2017/0214265 A1* | 7/2017 | Stevens | ................. | H01M 12/08 |
| 2020/0106284 A1* | 4/2020 | Zhang | ............... | H02J 7/007182 |
| 2022/0344733 A1* | 10/2022 | Zhou | ..................... | H01M 10/44 |
| 2022/0407191 A1* | 12/2022 | Ito | ........................ | H01M 50/107 |
| 2023/0096112 A1* | 3/2023 | Tian | .................... | H01M 50/538 |
| | | | | 429/7 |

FOREIGN PATENT DOCUMENTS

| | | |
|---|---|---|
| CN | 102683742 A | 9/2012 |
| CN | 206059512 U | 3/2017 |
| CN | 108646190 A | 10/2018 |
| CN | 108777331 A | 11/2018 |
| CN | 110098646 A | 8/2019 |
| CN | 111954965 A | 11/2020 |
| JP | 2007-311107 A | 11/2007 |

OTHER PUBLICATIONS

International Search Report mailed Mar. 15, 2022, corresponding to International Application No. PCT/CN2021/103869; 4 pages.

* cited by examiner

*Primary Examiner* — Nathaniel R Pelton
(74) *Attorney, Agent, or Firm* — Maier & Maier, PLLC

(57) ABSTRACT

An electrochemical device includes a negative electrode plate, a positive electrode plate and a separator provided between the negative electrode plate and the positive electrode plate. There are m negative tabs electrically connected to the negative electrode plate, wherein m is a positive integer greater than or equal to 1. There are n positive tabs electrically connected to the positive electrode plate, wherein n is a positive integer greater than 1, and n>m. The electrochemical device is charged with a multi-stage constant current charging method.

13 Claims, 9 Drawing Sheets

310

400

# ELECTROCHEMICAL DEVICE, CHARGING DEVICE, CHARGING METHOD, SYSTEM AND ELECTRONIC DEVICE

CROSS REFERENCE TO RELATED APPLICATION

The present application is a bypass continuation application of PCT international application: PCT/CN2021/103869, filed on Jun. 30, 2021, the disclosure of which is hereby incorporated by reference in its entirety.

TECHNICAL FIELD

This application relates to the technical field of electrochemical devices, in particular to an electrochemical device, a charging device, a charging method, a system, and an electronic device.

BACKGROUND

The electrochemical device can be installed in an electronic device to provide electrical energy for the electronic device. A charging device (for example, a charger connected to an AC power supply) may be connected to the electronic device and charge the electrochemical device therein. With the continuous development of fast charging technology, the charging speed of the electrochemical device is getting faster and faster. However, as the charging speed increases, the impact on the life of the electrochemical device is also increasing. At present, a mean of the traditional CC-CV charging (i.e., constant current-constant voltage charging) is mainly used in the industry to charge electrochemical devices, and the running time of the positive electrode at a high potential in the electrochemical device is shortened by increasing the voltage of the electrochemical device during the constant voltage charging, thereby prolonging the service life of the electrochemical device. However, this could cause the temperature of the electrode assembly in the electrochemical device to rise relatively quickly, and the electronic device generates heat severely. Therefore, it needs to provide a technical solution to solve the aforementioned problems.

SUMMARY

In view of this, the present application provides an electrochemical device, a charging device, a charging method, a system, and an electronic device. The amount of positive tabs of the electrochemical device provided in the application is greater than that of negative tabs, and the electrochemical device is charged with a multi-stage constant current charging. The applicant discovers by a large amount of experiments that such an arrangement enables to improve the cycle performance of the electrode assembly in the electrochemical device, reduce the temperature rise of the electrode assembly, and then prolong the service life of the electrochemical device.

The application controls the amount of positive tabs to be greater than that of negative tabs by adjusting the amount of positive and negative tabs, and increases the charging voltage and reduces the charging cut-off current by combining the multi-stage constant current charging. On the one hand, the charging time at the constant current stage can be extended, and the charging time at the constant voltage stage can be shortened, thereby shortening the running time of the positive electrode at a high potential and increasing the charging speed. On the other hand, the potential of the positive electrode can be lowered so that the potential of the positive electrode is lower than that of the negative electrode, thereby improving the polarization of the positive electrode, enhancing the stability of the positive electrode material, improving the cycle performance of the electrode assembly, and reducing the temperature rise of the electrode assembly.

The first aspect of some embodiments of the application provides an electrochemical device. The electrochemical device comprises a negative electrode plate, a positive electrode plate, and a separator provided between the negative electrode plate and the positive electrode plate. The device further comprises m negative pole tabs electrically connected to the negative electrode plate, where m is a positive integer greater than or equal to 1, and n positive pole tabs electrically connected to the positive electrode plate, where n is a positive integer greater than 1, and n>m. The electrochemical device is charged by a multi-stage constant current charging.

Some embodiments of the application include technical effects: the amount of positive tabs is greater than that of negative tabs in the electrochemical device provided in the present application, and the electrochemical device is charged by a multi-stage constant current charging. The applicant discovers by a large amount of experiments that such an arrangement enables to improve the cycle performance of the electrode assembly in the electrochemical device, reduce the temperature rise of the electrode assembly, and then prolong the service life of the electrochemical device.

In one embodiment, the amount of the positive tabs n and the amount of the negative tabs m satisfy: $1 < n/m \leq 4$.

In one embodiment, the amount of the positive tabs n and the amount of the negative tabs m satisfy: $2 \leq n/m \leq 3$.

Some embodiments of the present application include the technical effects: the applicant discovers through experiments that the electrochemical device can withstand a different charging cut-off voltage by adjusting the ratio of the amount of positive tabs to that of negative tabs. When the ratio of the amount of positive tabs and that of negative tabs satisfies $2 \leq n/m \leq 3$, it can withstand a higher charging cut-off voltage. Furthermore, after the charging cut-off voltage is increased, a better cycle performance can still be maintained.

In one embodiment, the electrochemical device is charged by a two-stage constant current charging, and the electrochemical device is configured to: receive a charging current having a first current value $I_1$ until the voltage of the electrochemical device reaches a first voltage value $U_1$, and receive a charging current having the second current value $I_2$ until the voltage of the electrochemical device reaches a second voltage value $U_2$. The second current value $I_2$ is less than the first current value $I_1$, and the second voltage value $U_2$ is greater than the first voltage value $U_1$. The electrochemical device is configured to be applied with a charging voltage having the second voltage value $U_2$ until the current of the electrochemical device reaches a charging cut-off current value $I_0$.

Some embodiments of the present application include the technical effects: the applicant uses the traditional constant current-constant voltage charging and the two-stage constant current charging to charge the electrochemical devices provided in some embodiments of the present application, respectively. When using the two-stage constant current charging, the electrochemical device can withstand a higher charging cut-off voltage and maintain a better cycle performance.

In one embodiment, $I_0$ is no less than 0.1 C.

Some embodiments of the application include the technical effects: since the charging is done by the multi-stage constant current charging, and the charging cut-off voltage at the constant current charging stage is increased, the charging time at the constant current stage is extended, and the charging time at the constant voltage stage is shortened, and thus the running time of the positive electrode at a high potential is shortened and the charging speed is increased.

In one embodiment, the charging voltage limit of the electrochemical device is $U_0$, and the second voltage value $U_2$ and the charging voltage limit $U_0$ satisfy:

$$\frac{1}{448} \le \frac{(U_2 - U_0)}{U_0} \le \frac{3}{224}.$$

In one embodiment, the second voltage value $U_2$ and the charging voltage limit $U_0$ satisfy:

$$\frac{1}{112} \le \frac{(U_2 - U_0)}{U_0} \le \frac{3}{224}.$$

Some embodiments of the application include the technical effects: the applicant sets a different charging cut-off voltage (second voltage value $U_2$) for the electrochemical device, and discovers that when the amount of positive tabs and that of negative tabs in the electrochemical device meet the aforementioned conditions, the charging limit voltage satisfies the above conditions, and a better test effect can be obtained.

In one embodiment, the electrochemical device is charged by a three-stage constant current charging, and the electrochemical device is configured to perform the following operations. A charging current having a first current value $I_1$ is received until the voltage of the electrochemical device reaches the first voltage value $U_1$, and a charging current having a second current value $I_2$ is received until the voltage of the electrochemical device reaches the second voltage value $U_2$. Among them, the second current value $I_2$ is less than the first current value $I_1$, and the second voltage value $U_2$ is greater than the first voltage value $U_1$. A charging current having a third current value $I_3$ is received until the voltage of the electrochemical device reaches a third voltage value $U_3$. Among them, the third current value $I_3$ is less than the second current value $I_2$. The third voltage value $U_3$ is greater than the second voltage value $U_2$. A charging voltage with the third voltage value $U_3$ is applied until the current of the electrochemical device reaches the charging cut-off current value $I_0$.

Some embodiments of the application include the technical effects: the applicant uses the traditional constant current-constant voltage charging and the two-stage constant current charging to charge the electrochemical devices provided in some embodiments of the present application, respectively. When using the two-stage constant current charging, the electrochemical device can withstand a higher charging cut-off voltage and maintain a better cycle performance.

In one embodiment, $I_0$ is no less than 0.1 C.

In one embodiment, the charging voltage limit of the electrochemical device is $U_0$, and the third voltage value $U_3$ and the charging voltage limit $U_0$ satisfy:

$$\frac{1}{448} \le \frac{(U_3 - U_0)}{U_0} \le \frac{3}{224}.$$

In one embodiment, the third voltage value $U_3$ and the charging voltage limit $U_0$ satisfy:

$$\frac{1}{112} \le \frac{(U_3 - U_0)}{U_0} \le \frac{3}{224}.$$

Some embodiments of the application include the technical effects: the applicant sets a different charging cut-off voltage (third voltage value $U_3$) for the electrochemical device, and discovers that when the amount of positive tabs and that of negative tabs in the electrochemical device meet the aforementioned conditions, the charging limit voltage satisfies the above conditions, and a better test effect can be obtained.

Another aspect of some embodiments of the application provides a charging device configured to charge the electrochemical device provided in some embodiments of the application. The electrochemical device comprises a negative electrode plate, a positive electrode plate, and a separator provided between the negative electrode plate and the positive electrode plate. The device further comprises m negative tabs electrically connected to the negative electrode plate, where m is a positive integer greater than or equal to 1, and n positive tabs electrically connected to the positive electrode plate, where n is a positive integer greater than 1, and n>m. The electrochemical device is charged by a multi-stage constant current charging.

In one embodiment, the amount of the positive tabs n and the amount of the negative tabs m satisfy: $1 < n/m \le 4$.

In one embodiment, the amount of the positive tabs n and the amount of the negative tabs m satisfy: $2 \le n/m \le 3$.

In one embodiment, the charging device is configured to charge the electrochemical device by a two-stage constant current charging. Specifically, the charging device is configured to perform the following operations. The electrochemical device is charged with the charging current having the first current value $I_1$ until the voltage of the electrochemical device reaches the first voltage value $U_1$. The electrochemical device is charged with the charging current having the second current value $I_2$ until the voltage of the electrochemical device reaches the second voltage value $U_2$, wherein the second current value $I_2$ is less than the first current value $I_1$, and the second voltage value $U_2$ is greater than the first voltage value $U_1$. The charging voltage with the second voltage value $U_2$ is applied to the electrochemical device until the current of the electrochemical device reaches the charging cut-off current value $I_0$.

In one embodiment, $I_0$ is no less than 0.1 C.

Some embodiments of the application include the technical effects: since the charging is done by the multi-stage constant current charging and the charging cut-off voltage at the constant current charging stage is increased, the charging time at the constant current stage is extended, and the charging time at the constant voltage stage is shortened, and thus the running time of the positive electrode at a high potential is shortened and the charging speed is increased.

In one embodiment, the charging voltage limit of the electrochemical device is $U_0$, and the second voltage value $U_2$ and the charging voltage limit $U_0$ satisfy:

$$\frac{1}{448} \le \frac{(U_2 - U_0)}{U_0} \le \frac{3}{224}.$$

In one embodiment, the second voltage value $U_2$ and the charging voltage limit $U_0$ satisfy:

$$\frac{1}{112} \le \frac{(U_2 - U_0)}{U_0} \le \frac{3}{224}.$$

The charging device is configured to charge the electrochemical device by a three-stage constant current charging, and the electrochemical device is specifically configured to perform the following operations. The electrochemical device is charged with the charging current having the first current value $I_1$ until the voltage of the electrochemical device reaches the first voltage value $U_1$. The electrochemical device is charged with the charging current having the second current value $I_2$ until the voltage of the electrochemical device reaches the second voltage value $U_2$, wherein the second current value $I_2$ is less than the first current value $I_1$, and the second voltage value $U_2$ is greater than the first voltage value $U_1$. The electrochemical device is charged with the charging current having the third current value $I_3$ until the voltage of the electrochemical device reaches the third voltage value $U_3$, wherein the third current value $I_3$ is less than the second current value $I_2$, and the third voltage value $U_3$ is greater than the second voltage value $U_2$. The electrochemical device is applied with a charging voltage having the third voltage value $U_3$ until the current of the electrochemical device reaches the charging cut-off current value $I_0$.

In one embodiment, $I_0$ is no less than 0.1 C.

In one embodiment, the charging voltage limit of the electrochemical device is $U_0$, and the third voltage value $U_3$ and the charging voltage limit $U_0$ satisfy:

$$\frac{1}{448} \le \frac{(U_3 - U_0)}{U_0} \le \frac{3}{224}.$$

In one embodiment, the third voltage value $U_3$ and the charging voltage limit $U_0$ satisfy:

$$\frac{1}{112} \le \frac{(U_3 - U_0)}{U_0} \le \frac{3}{224}.$$

Another aspect of some embodiments of the application provides a charging method, which is applied to the electrochemical device provided in some embodiments of the application. The electrochemical device comprises a negative electrode plate, a positive electrode plate, and a separator provided between the negative electrode plate and the positive electrode plate. The device further comprises m negative tabs electrically connected to the negative electrode plate, where m is a positive integer greater than or equal to 1, and n positive tabs electrically connected to the positive electrode plate, where n is a positive integer greater than 1, and n>m. The electrochemical device is charged by a multi-stage constant current charging.

In one embodiment, the charging method includes the following steps. The electrochemical device is charged with the charging current having the first current value $I_1$ until the voltage of the electrochemical device reaches the first voltage value $U_1$. The electrochemical device is charged with the charging current having the second current value $I_2$ until the voltage of the electrochemical device reaches a second voltage value $U_2$, wherein the second current value $I_2$ is less than the first current value $I_1$, and the second voltage value $U_2$ is greater than the first voltage value $U_1$. The charging voltage having the second voltage value $U_2$ is applied to the electrochemical device until the current of the electrochemical device reaches the charging cut-off current value $I_0$.

In one embodiment, the charging voltage limit of the electrochemical device is $U_0$, and the second voltage value $U_2$ and the charging voltage limit $U_0$ satisfy:

$$\frac{1}{448} \le \frac{(U_2 - U_0)}{U_0} \le \frac{3}{224}.$$

In one embodiment, the second voltage value $U_2$ and the charging voltage limit $U_0$ satisfy:

$$\frac{1}{112} \le \frac{(U_2 - U_0)}{U_0} \le \frac{3}{224}.$$

In one embodiment, the charging method comprises the following steps. The electrochemical device is charged with the charging current having the first current value $I_1$ until the voltage of the electrochemical device reaches the first voltage value $U_1$. The electrochemical device is charged with the charging current having the second current value $I_2$ until the voltage of the electrochemical device reaches the second voltage value $U_2$, wherein the second current value $I_2$ is less than the first current value $I_1$, and the second voltage value $U_2$ is greater than the first voltage value $U_1$. The electrochemical device is charged with the charging current having the third current value $I_3$ until the voltage of the electrochemical device reaches the third voltage value $U_3$, wherein the third current value $I_3$ is less than the second current value $I_2$, and the third voltage value $U_3$ is greater than the second voltage value $U_2$. The charging voltage having the third voltage value $U_3$ is applied to the electrochemical device until the current of the electrochemical device reaches the charging cut-off current value $I_0$.

In one embodiment, $I_0$ is no less than 0.1 C.

In one embodiment, the charging voltage limit of the electrochemical device is $U_0$, and the third voltage value $U_3$ and the charging voltage limn $U_0$ satisfy:

$$\frac{1}{448} \le \frac{(U_3 - U_0)}{U_0} \le \frac{3}{224}.$$

In one embodiment, the third voltage value $U_3$ and the charging voltage limit $U_0$ satisfy:

$$\frac{1}{112} \le \frac{(U_3 - U_0)}{U_0} \le \frac{3}{224}.$$

Another aspect of some embodiments of the application provides a system which comprises the charging device provided in the embodiment of the application and the electrochemical device provided in the embodiment of the application. The charging device is electrically connected to the electrochemical device.

Another aspect of some embodiments of the application provides an electronic device. The electronic device comprises the electrochemical device provided in the embodiment of the application, and the electrochemical device supplies power to the electronic device.

EXPLANATION OF REFERENCE SYMBOLS AND NUMERALS

Figure 1:
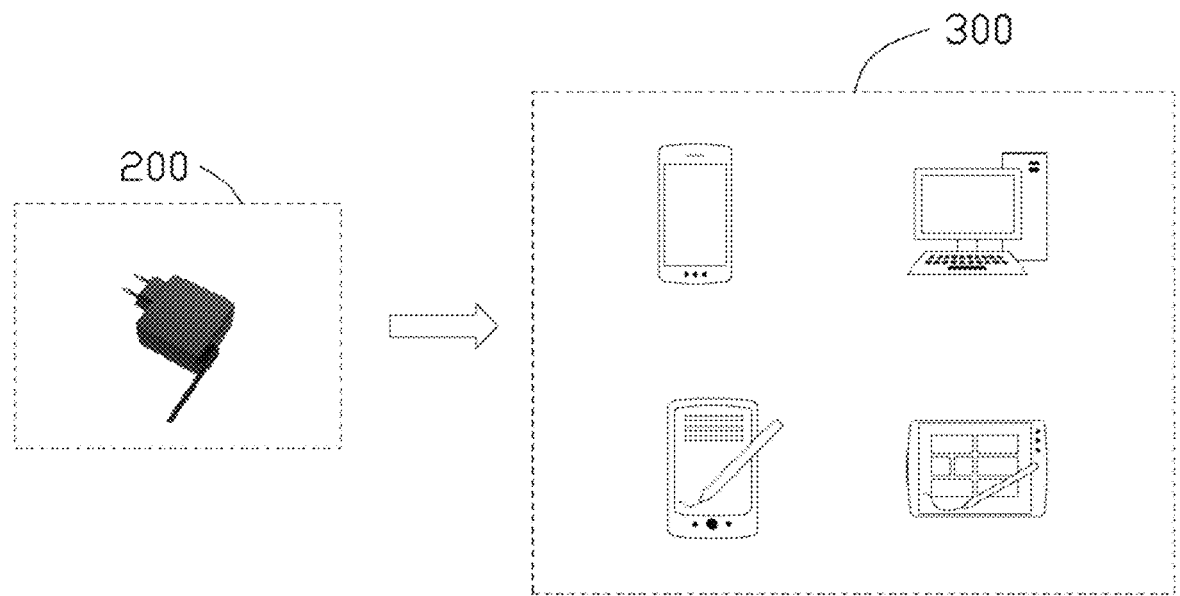
FIG. 1 is a schematic diagram of a charging device and an electronic device in an embodiment of the application.

100 Charging system
200 Charging device
300 Electronic device
310 Electrochemical device
210 First memory
220 First processor
230 First interface
221 Charging and discharging module
222 Control module
320 Second interface
400 Battery management system
410 Second memory
420 Second processor
430 Sensor
330 Display unit
340 Input unit
350 Sensor unit
360 Controller
370 Communication unit
380 Storage unit
390 Audio unit
500 Electrode assembly
510 Negative electrode plate
520 Positive electrode plate
530 Separator
511 Negative tab
521 Positive tab
421 Acquisition module
422 Constant current charging module
423 Constant voltage charging module

DETAILED DESCRIPTION

In order to enable to understand the above objectives, features and advantages of the application more clearly, the application will be described in detail below with reference to the accompanying drawings and specific embodiments. It is noted that some embodiments of the application and the features in some embodiments can be combined with each other without conflict. In the following description, many specific details are set forth in order to fully understand the present application, and the described embodiments are only a part of some embodiments of the present application, rather than all some embodiments.

FIG. 1 is a schematic diagram of a charging device 200 and an electronic device 300 according to an embodiment of the present application.

With reference to FIG. 1, a charging device 200 (such as a charger) is used to charge various electronic devices 300 (such as a smart phone, a tablet computer, a personal computer, a personal digital assistant, etc.). Among them, the charging device 200 may be various chargers, such as a lead-acid battery charger, a cadmium-nickel battery charger, a nickel-hydrogen battery charger, a lithium-ion battery charger, an electric vehicle battery charger, and the like. The electronic device 300 includes, but is not limited to, smart phones, tablet computers, personal computers, personal digital assistants, eBook Readers, workstations, servers, drones, electric vehicles, and the like.

Figure 2:
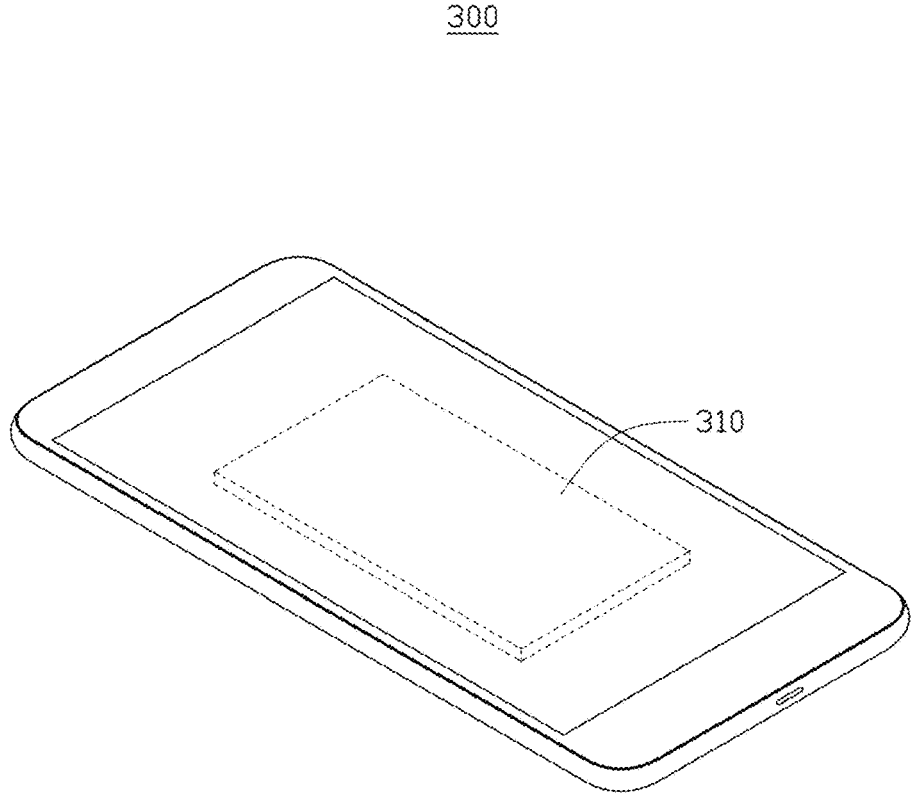
FIG. 2 is a schematic diagram of an electronic device in an embodiment of the application.

FIG. 2 is a schematic diagram of an electronic device 300 according to an embodiment of the present application.

With reference to FIG. 2, the electronic device 300 (such as a smart phone) includes an electrochemical device 310 (such as a battery). Among them, the electrochemical device 310 is used to provide electrical energy for the electronic device 300. The electrochemical device 310 may be various batteries, such as a lead-acid battery, a nickel-cadmium battery, a nickel-hydrogen battery, a lithium-ion battery, a lithium polymer battery, a lithium iron phosphate battery, and the like.

When the charging device 200 is used to charge the electronic device 300, on the one hand, users require the charging device 200 to have a faster charging speed, and on the other hand, they are also concerned about whether the electrochemical device 310 in the electronic device 300 is durable and whether the electronic device 300 generates serious heat. However, the electrochemical device 310 is generally not durable after being used for a period of time, the charging frequency of the electronic device 300 increases, and the electronic device 300 generates severe heat when being charged.

Based thereon, the present application provides an electrochemical device, a charging device, a charging method, a system, and an electronic device, which enables to improve the cycle performance of the electrode assembly in the electrochemical device, reduce the temperature rise of the electrode assembly, thereby extending the service life of the electrochemical device, and solving the problem that electronic devices generate serious heat when being charged.

Charging System

Figure 3:
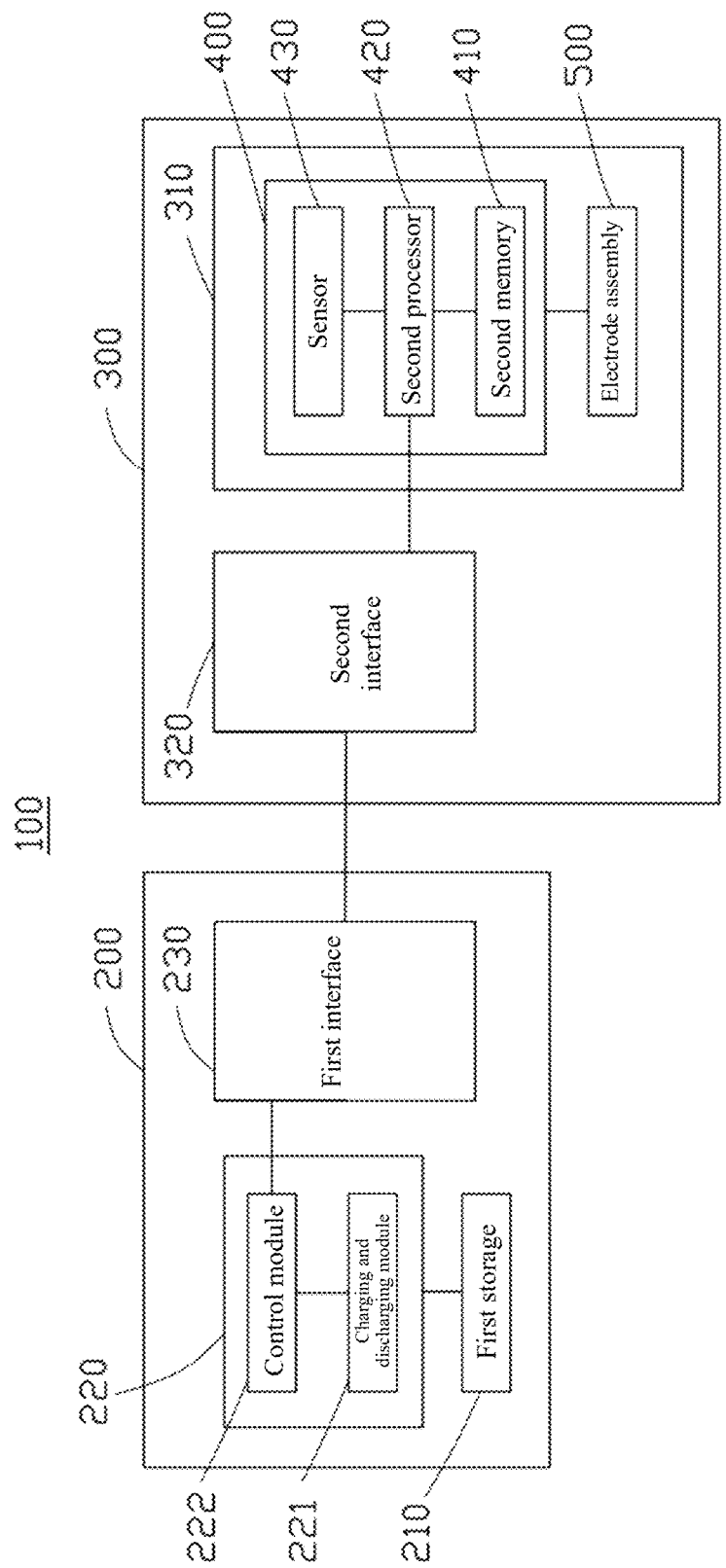
FIG. 3 is a structural schematic diagram of a charging system in an embodiment of the application.

FIG. 3 is a structural schematic diagram of a charging system 100 according to an embodiment of the present application.

With reference to FIG. 3, the charging system 100 comprises a charging device 200 and an electronic device 300. Among them, the charging device 200 comprises a first memory 210, a first processor 220, and a first interface 230. The electronic device 300 comprises an electrochemical device 310 and a second interface 320.

The charging device 200 may be connected to an external power source (not shown). The external power source can be an AC or DC power source. The charging device 200 can convert electric energy supplied from an external power source and charge the connected electronic device 300 through the first interface 230. It is understood that in this application, charging the electronic device 300 means charging the electrochemical device 310 in the electronic device, and the two expressions can be used interchangeably.

The charging process in which the charging device 200 charges the electrochemical device 310 (or, simply referred to as the charging process for the electrochemical device 310) may sequentially include a constant current charging stage (or mode) and a constant voltage charging stage (or mode).

At the constant current charging stage, the electrochemical device 310 is charged with a constant current. The voltage of the electrochemical device 310 (simply referred to as the charging voltage) rises rapidly, and when the charging voltage reaches the charging voltage threshold expected by the electrochemical device 310, it turns to the constant voltage charging stage. The constant current is usually a rated charging rate current, such as a large rate 3 C current, where C is the battery capacity of the electrochemical device 310. Assuming that the battery capacity is 1700 mAh, the constant current is 3*1700 mA=5.1 A.

At the constant voltage charging stage, the electrochemical device 310 is charged with a constant voltage, and the current of the electrochemical device 310 (simply referred to as the charging current) gradually decreases. When the charging current reduces to the set current threshold, the electrochemical device 310 is full charged. In the traditional CC-CV charging method, the current threshold is usually set to 0.01 C, where C is the battery capacity of the electrochemical device 310. Still assuming that the battery capacity is 1700 mAh, the current threshold is 0.01*1700 mA=17 mA.

Before entering the constant voltage charging stage, the charging process for the electrochemical device 310 may sequentially include M constant current charging stages (M is an integer greater than 1). The mode of charging the electrochemical device 310 with multiple constant current charging stage is also referred to as a multi-stage constant current charging mode or a multi-stage constant current charging mode. The multi-stage constant current charging starts the first multi-stage constant current charging with a predetermined charging current. The M constant current stages of the multi-stage constant current charging are executed in sequence from the first stage to the Mth stage. After the previous constant current stage turns to the next constant current stage at the constant current stage, the current size can be reduced; when the battery voltage reaches the charging termination voltage threshold, the previous constant current stage will turn to the next constant current stage at the constant current stage. The current conversion process between two adjacent constant current stages can be gradual or stepwise jump changes. In some embodiments, M is 2 or 3. Correspondingly, the charging mode of the electrochemical device 310 includes two-stage constant current charging or three-stage constant current charging.

The first interface 230 may be connected to the electronic device 300 and supply power to the electronic device 300. The first interface 230 includes, but is not limited to, High Definition Multimedia Interface (HDMI), Universal Serial Bus (USB), Mobile High-Definition Link (MHL), Secure digital card (SD card)/Multimedia Card (MMC) interface, Infrared Data Association (IrDA), optical interface, etc.

The first memory 210 is used to store a first computer program, and when the first computer program is executed by the first processor 220, the function of the charging device 200 can be realized. The first memory 210 includes a volatile or non-volatile storage device, such as Digital Versatile Disc (DVD) or other optical discs, magnetic disks, hard disks, Smart Media Card (SMC), and Secure Digital (SD) Card, Flash Card, etc.

The first processor 220 may manage the functions of the charging device 200. The first processor 220 includes, but is not limited to, Central Processing Unit (CPU), Digital Signal Processor (DSP), Application Specific Integrated Circuit (ASIC), Field-Programmable Gate Array (FPGA) or other programmable logic devices, discrete gate or transistor logic devices, discrete hardware components, etc.

The first processor 220 may communicate with the electronic device 300. The first processor 220 comprises a charging and discharging module 221 and a control module 222. Among them, the control module 222 may control the charging and discharging module 221 according to the charging mode based on the communication with the electronic device 300 (for example, the electrochemical device 310 in the electronic device 300).

The charging and discharging module may comprise a charging circuit. The charging circuit is connected to the second interface 320 and the electrochemical device 310 for charging the electrochemical device 310. For the specific implementation of the second interface 320, reference may be made to the related description of the first interface 230, which will not be repeated here.

In one of some embodiments, the control module 222 may receive information from the electronic device 300 to control the charging and discharging module 221 to perform constant current charging or constant voltage charging to the electronic device 300. The control module 222 may control the charging and discharging module 221 to charge the electronic device 300 at multiple stages. In some embodiments, the multiple stages include multiple constant current charging stages and one constant voltage charging stage.

The electronic device 300 may be connected to the charging device 200 via the second interface 320. The second interface 320 is used to supply to the electronic device 300 the electric energy input from the charging device 200. For the interface type included in the second interface 320, reference may be made to the first interface 230. When the interface type of the second interface 320 and the first interface 230 are identical, the second interface 320 may be directly connected to the first interface 230. When the interface type of the second interface 320 and the first interface 230 are different, the second interface 320 may be indirectly connected to the first interface 230 via an adapter.

The electrochemical device 310 comprises a battery management system (BMS) 400. In one of some embodiments, the battery management system 400 may be configured in the housing of the electrochemical device 310. In another embodiment, the battery management system 400 may also be configured in the housing of the charging device 200.

In one of some embodiments, the battery management system 400 is connected to the charging device 200 to control the charging device 200 to charge the electronic device 300. Specifically, the battery management system 400 sends a charging and discharging command to the control module 222 of the charging device 200, and the control module 222 controls the charging and discharging module 221 to perform charging and discharging operations on the electronic device 300 according to the received charging and discharging command.

The battery management system 400 comprises a second memory 410, a second processor 420, and a sensor 430.

The sensor 430 is used to collect information (such as voltage, current, temperature, etc.) of the electrochemical device 310. The sensor 430 includes, but is not limited to, a voltage sensor, a current sensor, a temperature sensor, and the like. The voltage sensor and the current sensor may comprise a detection circuit. The detection circuit may be used to detect the output voltage and/or current of the charging circuit in the charging and discharging module 221, and the output voltage and/or current are directly loaded on the electrochemical device 310 (for example, the electrode assembly 500 of the electrochemical device 310) to charge the electrochemical device 310.

The second memory 410 is used to store a second computer program. When the second computer program is executed by the second processor 420, the function of the battery management system 400 can be implemented. For the type included in the second memory 410, reference may be made to the first memory 210.

The second processor 420 may manage the electric energy of the electronic device 300. For the type included in the second processor 420, reference may be made to the first processor 220.

The second processor 420 may be electrically connected to the second interface 320. When the charging device 200 is used to charge the electronic device 300, the second processor 420 may perform communication with the control module 222 of the charging device 200 in order to control the charging and discharging module 221 to transmit voltage or current via the second interface 320.

In one of some embodiments, the second processor 420 may exchange information regarding the voltage value and/or current value required by the electronic device 300 with the control module 222 of the charging device 200 through communication. In one of some embodiments, the second processor 420 may send the charging voltage value or the charging current value for charging to the charging device 200.

The second processor 420 may set a charging voltage value or a charging current value, and send the set charging voltage value or charging current value to the charging device 200. The second processor 420 may control to transmit the charging voltage value or the charging current value through communication with the charging device 200.

Electronic Device

Figure 4:
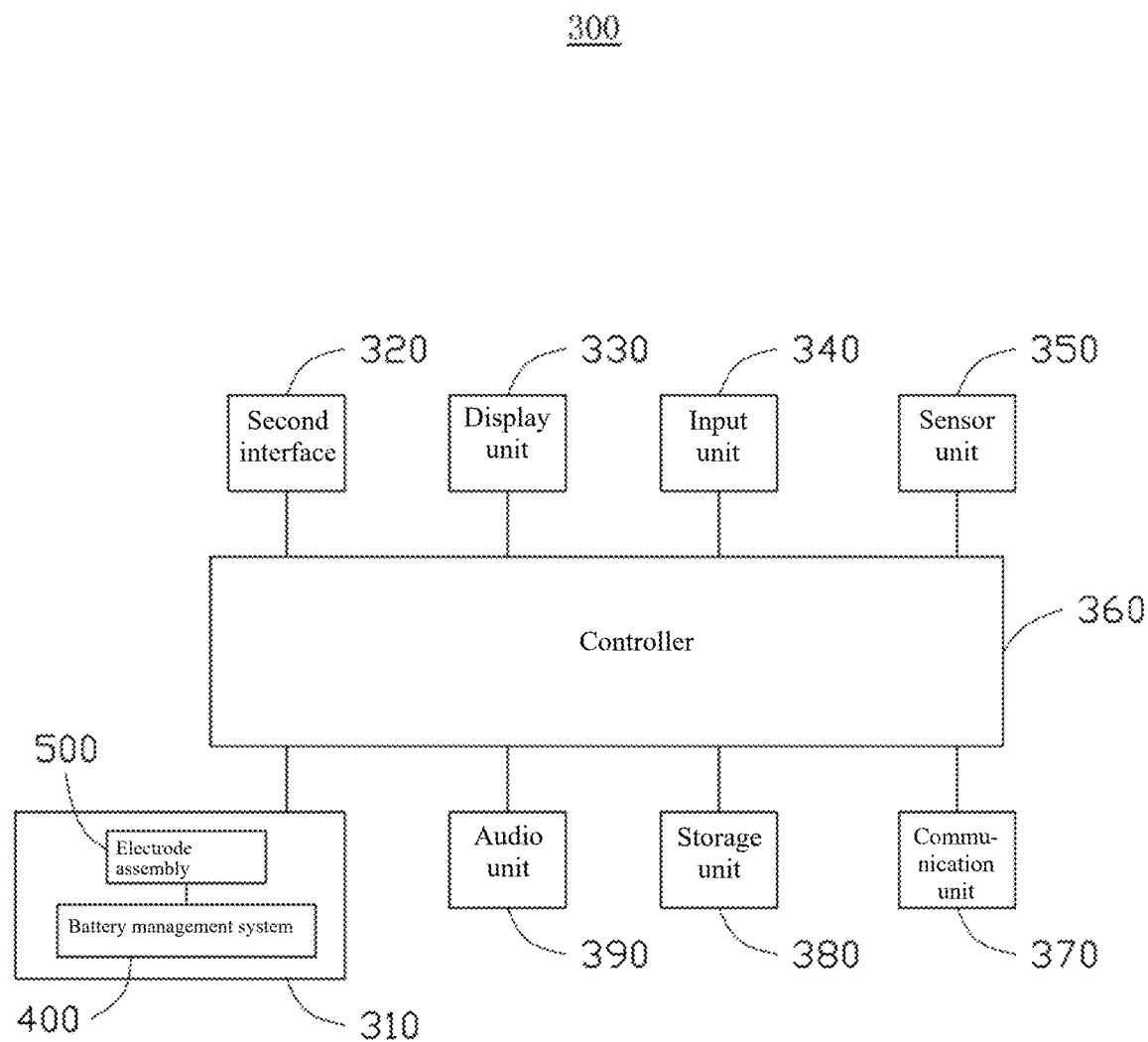
FIG. 4 is a structural schematic diagram of an electronic device in an embodiment of the application.

FIG. 4 is a structural schematic diagram of an electronic device 300 according to an embodiment of the present application.

With reference to FIG. 4, the electronic device 300 may comprise an electrochemical device 310, a second interface 320, a display unit 330, an input unit 340, a sensor unit 350, a controller 360, a communication unit 370, a storage unit 380, and an audio unit 390.

In one of some embodiments, the electronic device 300 may comprise the above-mentioned components in the housing. The electronic device 300 may be connected to the charging device 200. The electronic device 300 may be connected to the charging device 200 via the second interface 320, and the second interface 320 may be connected to the first interface 230 of the charging device 200. The various components of the electronic device 300 may be connected via a bus or directly connected to each other.

The display unit 330 may display information. This application can employ well-known displays, which are not limited herein.

The input unit 340 may receive an input instruction for controlling the electronic device 300 from the user. The input unit 340 may receive a touch input instruction from the user. The input unit 340 may comprise a touch panel. The touch panel may recognize touch input instructions based on, for example, at least one of the capacitance type, the resistance type, the infrared (IR) type, and the ultrasonic type. As an example, the input unit may accept information regarding the charging mode and charging parameters of the electronic device 200 input by the user.

The display unit 330 and the input unit 340 may be implemented integrally. For example, the electronic device 300 may comprise a touch screen. The touch screen can perform the input function and the display function simultaneously. The touch screen may be formed as a structure in which a touch panel and a display panel are integrated. The touch screen may comprise input/output devices.

The sensor unit 350 may measure the physical quantity or detect the operating state of the electronic device 300, and convert the measured or detected information into an electric signal, and send it to at least one of the controller 360 or the battery management system 400.

The controller 360 can control multiple hardware components (for example, the display unit 330, the input unit 340, the sensor unit 350, the communication unit 370, and the storage unit 380) or software components by driving an operating system or an application program, and can perform processing and calculation of various types of data including multimedia data. The controller 360 may be realized by, for example, a system on a chip.

The communication unit 370 may support the wireless communication function of the electronic device 300, and may be configured as a mobile communication module when the electronic device 300 supports the mobile communication function. This application can employ well-known mobile communication modules, which are not limited herein. The communication unit 370 may perform wired or wireless communication with the charging device 200 under control of the controller 360 (or the battery management system 400). For example, the communication unit 370 may transmit information regarding the charging of the electrochemical device 310 to the charging device 200.

The storage unit 380 can store image data, voice data, data input from the camera, data for processing calculations, algorithms required for the operation of the electronic device 300, configuration data, and guidance information, and can also temporarily store processing results. The application may employ a well-known memory, which is not limited herein.

The storage unit 380 may store instructions or data received or generated from the controller 360 or other components (for example, the display unit 330, the input unit 340, the sensor unit 350, and the communication unit 370).

The audio unit 390 can convert voice and electrical signals bidirectionally. The audio unit 390 may include, for example, at least one of a speaker, a receiver, an earphone, and a microphone to convert input or output voice data.

Electrochemical Device

Figure 5:
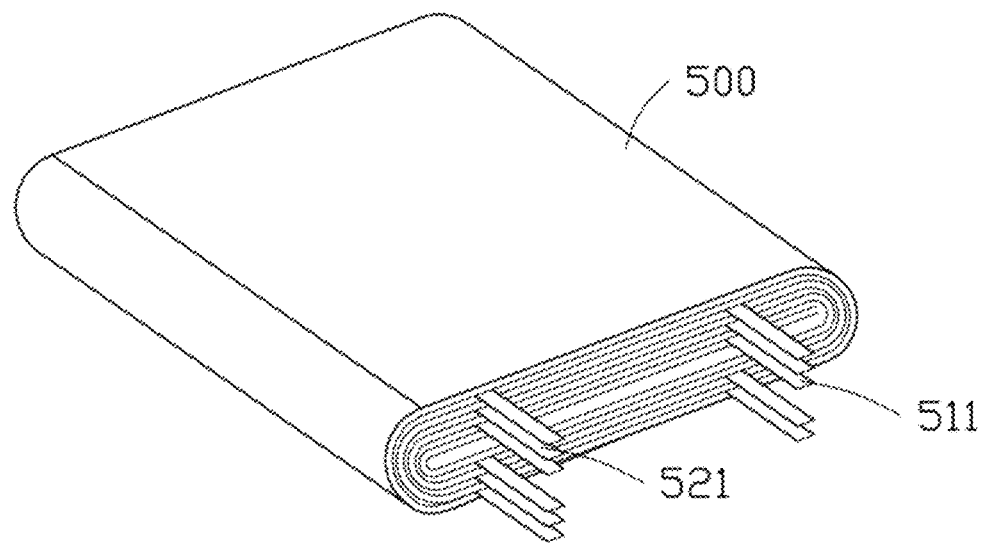
FIG. 5 is a structural schematic diagram of an electrode assembly in an embodiment of the application.

FIG. 5 is a structural schematic diagram of an electrode assembly 500 according to an embodiment of the present application.

With reference to FIG. 5, the electrochemical device 310 comprises a battery management system 400 (not shown) and an electrode assembly 500. The electrode assembly 500 comprises a negative electrode plate 510 (not shown), a positive electrode plate 520 (not shown), a negative tab 511, a positive tab 521, and a separator 530 (not shown). The separator 530 is provided between the negative electrode plate 510 and the positive electrode plate 520. The negative tab 511 is provided on the negative electrode plate 510 and is electrically connected to the negative electrode plate 510. The positive tab 521 is provided on the positive electrode plate 520 and is electrically connected to the positive electrode plate 520.

The electrode assembly 500 may be a laminated structure formed by stacking the negative electrode plate 510, the separator 530, and the positive electrode plate 520 in order, or a wound structure obtained by stacking the negative electrode plate 510, the separator 530, and the positive electrode plate 520 in order and winding. Among them, the separator 530 is located between the negative electrode plate 510 and the positive electrode plate 520 to play a role of isolation.

The positive electrode plate comprises a positive electrode current collector and a positive electrode active material layer. The positive electrode active material layer may be provided on one side or both sides of the positive electrode current collector.

The positive electrode current collector is usually a structure or part that can collect current. The positive electrode current collector can be various materials suitable for use as the positive electrode current collector of a lithium-ion battery in the art. For example, the positive electrode current collector can include but is not limited to metal foil, more specifically, it can include but not limited to nickel foil and aluminum foil. In some embodiments, aluminum foil is used as the positive electrode current collector.

The positive electrode active material layer comprises various positive active materials commonly used in the art. For example, for lithium-ion batteries, the positive electrode active material can be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, etc. However, the present application is not limited to these materials, and other conventionally well-known materials that can be used as positive electrode active materials of lithium-ion batteries can also be used. These positive electrode active materials may be used alone or in combination of two or more. Preferably, the positive electrode active materials can be selected from one or more of $LiCoO_2$, $LiNiO_2$, $LiMnO_2$, $LiMn_2O_4$, $LiNi_{1/3}Co_{1/3}Mn_{1/3}O_2$(NCM333), $LiNi_{0.5}Co_{0.2}Mn_{0.3}O_2$(NCM523), $LiNi_{0.6}Co_{0.2}Mn_{0.2}O_2$(NCM622), $LiNi_{0.8}Co_{0.1}Mn_{0.1}O_2$(NCM811), $LiNi_{0.85}Co_{0.15}Al_{0.05}O_2$, $LiFePO_4$, and $LiMnPO_4$.

Preferably, the positive electrode active material includes at least one of lithium cobaltate, lithium nickelate, lithium manganate, lithium iron phosphate, or lithium cobalt phosphate. The positive electrode active material includes at least one of $LiCoO_2$, $LiNiO_2$, $LiMnO_2$, or $LiCoPO_4$.

The positive electrode active material layer further comprises a conductive agent and a binder. Exemplary conductive agents include at least one of conductive carbon black, Ketjen black, lamellar graphite, graphene, carbon nanotubes, or carbon fibers. As the binder, for example, polyvinylidene fluoride can be used.

In some embodiments, the negative electrode comprises a negative electrode current collector and a negative electrode active material layer on one or both sides of the negative electrode current collector. The negative electrode current collector can be made of copper foil or other materials.

The negative electrode active material (for example, the first negative electrode active material and the second negative electrode active material) may each independently include the negative electrode active material known in the art that can perform reversible deintercalation of active ions, which is not limited in the present application. For example, the negative electrode active material useful for lithium-ion secondary batteries may include one or more of metallic lithium, natural graphite, artificial graphite, mesocarbon microbeads (abbreviated as MCMB), hard carbon, soft carbon, silicon, silicon-carbon composite, $SiO_x$ ($0<x<2$), Li—Sn alloy, Li—Sn—O alloy, Sn, SnO, $SnO_2$, spinel-structure lithium titanate and Li—Al alloy.

In some embodiments, the separator includes at least one of polyethylene, polypropylene, polyvinylidene fluoride, polyethylene terephthalate, polyimide, or aramid. For example, polyethylene includes at least one selected from high-density polyethylene, low-density polyethylene, or ultra-high molecular weight polyethylene. Particularly for polyethylene and polypropylene, they have a good effect on preventing short circuits, and can improve the stability of the battery through the shutdown effect. In some embodiments, the separator has a thickness within the range of about 5 μm to 500 μm.

The negative tab 511 may include an external negative tab and a negative electrode plate tab. The positive tab 521 may include an external positive tab and a positive electrode plate tab. In one of some embodiments, the negative electrode plate 510 comprises a negative electrode current collector, and at least one of the plurality (for example, m) of the negative tabs 511 is integrally formed on the negative electrode current collector.

The negative electrode current collector may be copper foil.

In one of some embodiments, the positive electrode plate 520 comprises a positive electrode current collector, and at least one of the plurality (for example, n) of the positive tabs 521 is integrally formed on the positive electrode current collector.

The positive electrode current collector may be aluminum foil.

At least one of the m negative tabs 511 is integrally formed on the negative electrode current collector, and/or at least one of the n positive tabs 521 is integrally formed on the positive electrode current collector. In some embodiments, the amount of the negative tabs m 511 is less than the amount of the positive tabs n 521, thereby further reducing the potential of the positive electrode, improving the stability of the positive electrode material, as well as improving the cycle performance of the electrode assembly 500.

In the embodiment of the present application, the X direction is defined as the lengthwise direction of the electrode assembly 500, the Y direction is defined as the heightwise direction of the electrode assembly 500, and the Z direction is defined as the thicknesswise direction of the electrode assembly 500.

Figure 6:
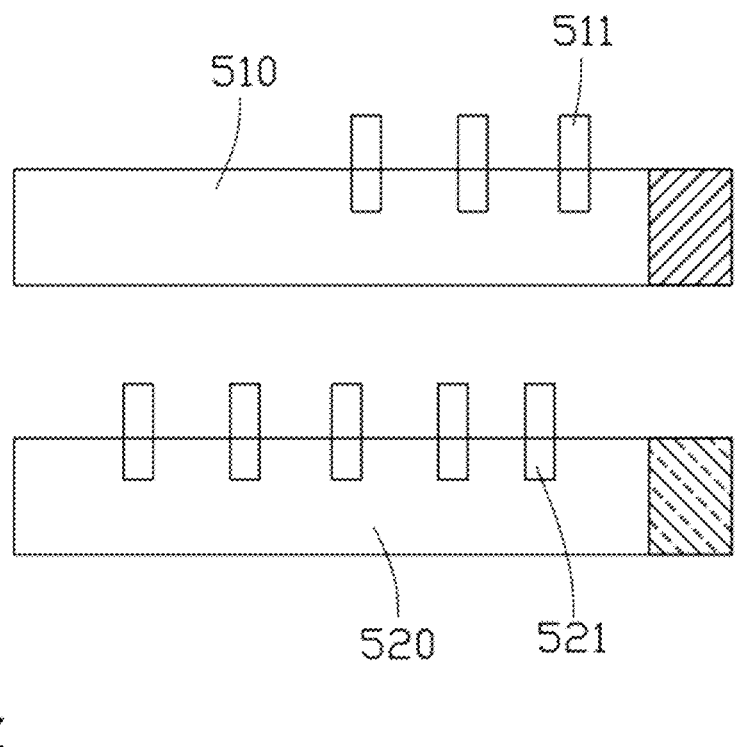
FIG. 6 is a schematic diagram of a tab in an embodiment of the application.

FIG. 6 is a schematic diagram of a tab of an embodiment of the application.

With reference to FIGS. 5 and 6 together, it can be seen from the cross section of the electrode assembly 500 along the YZ plane that the electrode assembly 500 may comprise a plurality of negative tabs 511 and a plurality of positive tabs 521.

In one of some embodiments, in the Z direction, the plurality of positive tabs 521 and the plurality of negative tabs 511 are arranged at intervals.

In the embodiment of the application, it is assumed that the amount of the negative tabs 511 is m, and m is a positive integer greater than or equal to 1. The amount of the positive tabs 521 is n, n is a positive integer greater than 1, and n>m.

In this embodiment, the amount of the positive tabs n 521 is greater than the amount of the negative tabs m 511, which can reduce the potential of the positive electrode, improve the polarization of the positive electrode, and increase the stability of the positive electrode material, thereby improving the cycle performance of the electrode assembly 500.

Further, by making n and m meet a certain proportional relationship by adjusting the amount of the positive tabs n 521 and the amount of the negative tabs m 511, and by using with the multi-stage constant current charging, the degree of improvement of the cycle performance and the energy density loss of the electrode assembly 500 can be balanced, thereby increasing the degree of improvement of the cycle performance of the electrode assembly 500.

In one of some embodiments, the amount n of positive tabs 521 and the amount m of negative tabs 511 satisfy:

$$1 < \frac{n}{m} \leq 4.$$

In another of some embodiments, the amount n of positive tabs 521 and the amount m of negative tabs 511 satisfy:

$$\frac{3}{2} \leq \frac{n}{m} \leq \frac{7}{2}.$$

In another of some embodiments, the amount n of positive tabs 521 and the amount m of negative tabs 511 satisfy:

$$2 \leq \frac{n}{m} \leq 3.$$

In the above three embodiments, when $$1 < \frac{n}{m} \leq 4,$$

the cyclic performance of the electrode assembly 500 is improved. When $$\frac{3}{2} \leq \frac{n}{m} \leq \frac{7}{2},$$

the degree of improvement of the cycle performance of the electrode assembly 500 is better. When $$2 \leq \frac{n}{m} \leq 3,$$

the degree of improvement of the cycle performance of the electrode assembly 500 is the best.

Figure 7:
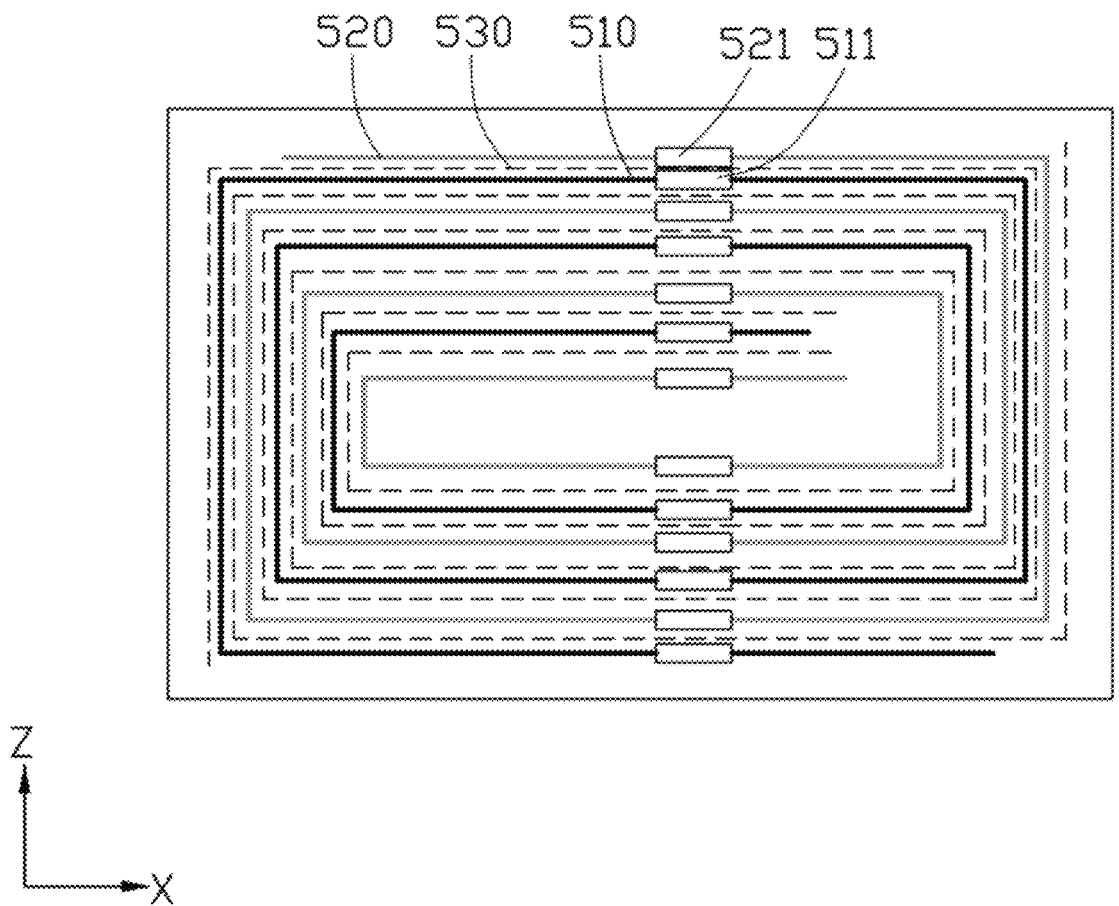
FIG. 7 is a schematic diagram of a cross-section along the XZ direction of an electrode assembly in an embodiment of the application.

FIG. 7 is a schematic diagram of a cross-section along the XZ direction of an electrode assembly according to an embodiment of the present application.

With reference to FIGS. 5 and 7 together. Assuming that the electrode assembly 500 is a wound structure, it can be seen from the cross-section of the electrode assembly 500 along the YZ plane that the negative electrode plate 510, the separator 530, and the positive electrode plate 520 are stacked in order. A plurality of (for example, m) negative tabs 511 are provided on the negative electrode plate 510, and a plurality of (for example, n) positive tabs 521 are provided on the positive electrode plate 520.

Figure 8:
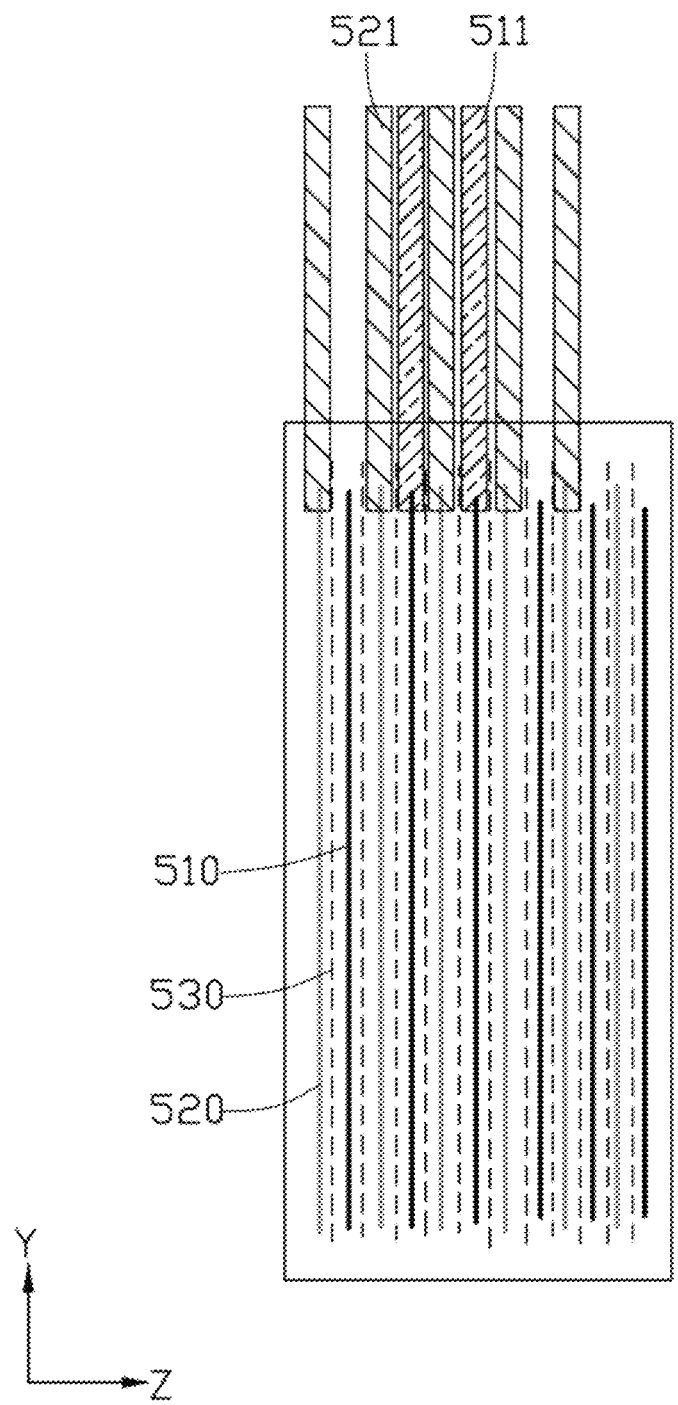
FIG. 8 is a schematic diagram of a cross-section along the YZ direction of the electrode assembly in FIG. 7.

FIG. 8 is a schematic diagram of a cross-section along the YZ direction of the electrode assembly in FIG. 7.

With reference to FIGS. 5 and 8 together. Assuming that the electrode assembly 500 is a wound structure, it can be seen from the cross-section of the electrode assembly 500 along the YZ plane that the negative electrode plate 510, the separator 530, and the positive electrode plate 520 are arranged in order. A plurality of (for example, m) negative tabs 511 and a plurality of (for example, n) positive tabs 521 are arranged crosswise. In one of some embodiments, the plurality of positive tabs 521 and the plurality of negative tabs 511 are arranged crosswise at equal intervals.

Battery Management System

Figure 9:
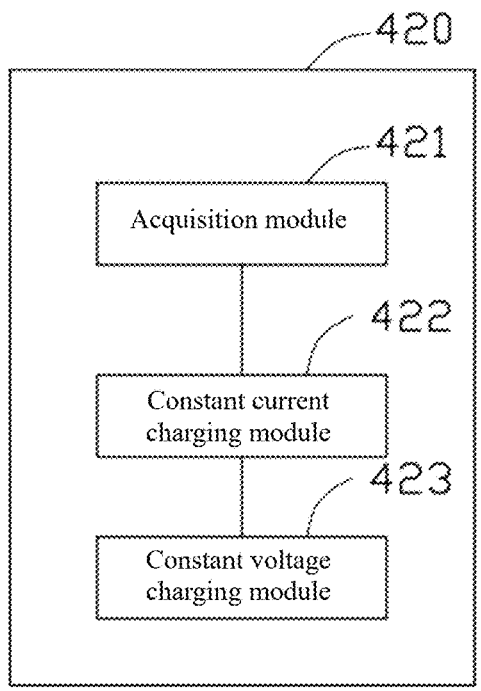
FIG. 9 is a structural schematic diagram of a battery management system in an embodiment of the application.

FIG. 9 is a structural schematic diagram of a battery management system 400 according to an embodiment of the present application.

With reference to FIGS. 3 and 9 together, the battery management system 400 comprises a second processor 420. The second processor 420 may comprise an acquisition module 421, a constant current charging module 422, and a constant voltage charging module 423. Among them, the acquisition module 421 is electrically connected to the constant current charging module 422 and the constant voltage charging module 423. The following description of the acquisition module 421, the constant current charging module 422, and the constant voltage charging module 423 are merely exemplary, and are not intended to limit the application. For example, the functions of one or more of the acquisition module 421, the constant current charging module 422, and the constant voltage charging module 423 may be integrated in the first processor 220 (for example, the control module 222), or in one or more components of the electronic device 300.

The acquisition module 421 is used to acquire the charging parameters, the real-time charging voltage and/or the real-time charging current of the electrochemical device 310. The acquisition module may acquire one or more of the first current value $I_1$, the second current value $I_2$, the first voltage value $U_1$, the second voltage value $U_2$, or the charging cut-off current value $I_0$ from other modules of the battery management system 400, for example, the second memory 410. The acquisition module can acquire the real-time charging voltage and real-time charging current of the electrochemical device 310 from the sensor 430 of the battery management system 400 (for example, the detection circuit of the sensor 430) to determine whether to enter the next charging stage, for example, whether to enter the next constant current charging stage from the current constant current charging stage, and/or whether to enter the constant voltage charging stage from the current constant current charging stage.

The constant current charging module 422 is used to control the charging device 200 to charge the electrochemical device 310 with the first charging current $I_1$ until the voltage of the electrochemical device 310 reaches the first voltage value $U_1$, and charge the electrochemical device 310 with the second charging current $I_2$ until the voltage of the electrochemical device 310 reaches the second voltage value $U_2$. Among them, the second current value $I_2$ is less than the first current value $I_1$, and the second voltage value $U_2$ is greater than the first voltage value $U_1$.

In this application, the voltage of the electrochemical device 310 refers to the open circuit voltage of the electrochemical device 310, and the current of the electrochemical device 310 refers to the open circuit current of the electrochemical device 310.

It is noted that, for the convenience of expression, the expression "charging current having the first current value $I_1$" can be briefly expressed as "the first charging current $I_1$". Similarly, the expression "charging current having the second current value $I_2$" can be briefly expressed as "the second charging current $I_2$", and the expression "charging current having the third current value $I_3$" can be briefly expressed as "the third charging current $I_3$". The expression "the charging voltage limit" can be used interchangeably with "the charging limit voltage".

In one of some embodiments, the second voltage value $U_2$ and the charging voltage limit $U_0$ of the electrochemical device 310 satisfy:

$$\frac{1}{448} \le \frac{(U_2 - U_0)}{U_0} \le \frac{3}{224}.$$

In another of some embodiments, the second voltage value $U_2$ and the charging voltage limit $U_0$ of the electrochemical device 310 satisfy:

$$\frac{1}{112} \le \frac{(U_2 - U_0)}{U_0} \le \frac{3}{224}.$$

The charging voltage limit $U_0$ refers to the voltage value obtained when the battery employs the setting of the traditional single positive tab and single negative tab, employs the traditional constant current-constant voltage charging mode, and transfers from the constant current charging to the constant voltage charging. Generally speaking, the voltage will continue to rise during the constant current charging of the battery. When it rises to "the charging voltage limit", the battery will no longer perform an charging action that will cause its voltage to rise, but will turn to the constant voltage charging stage, in order to prevent damaging and irreversible electrochemical reactions occurred in the battery.

The amount of positive tabs of the electrochemical device 310 is controlled to be one, and the amount of negative tabs is controlled to be one. The charging limit voltage of the electrochemical device 310 can be determined in at least one of the following methods:

Method 1: the electrochemical device 310 to be tested is charged at a constant current to a voltage of 4.2V with a C charging current, and is then charged at a constant voltage until the charge-discharge rate reaches 0.05 C and stop charging. After that, the battery is discharged to 3.0V at a rate of 0.2 C. The aforementioned charge and discharge cycle is performed for 500 times. If the lithium-ion battery does not dive, the cut-off voltage of the constant current charging stage will increase by 50 mV, and the above procedure is repeated again. The cut-off voltage of the constant current charging stage is increased until the electrochemical device 310 dives within 500 cycles. Under the cut-off voltage of a certain constant current charging stage, if the lithium-ion battery starts to dive, the charging limit voltage of the electrochemical device 310 is the cut-off voltage of the constant current charging stage minus 50 mV.

Method 2: the experiments are performed on 10 electrochemical devices 310. The 10 electrochemical devices 310 to be tested are charged at constant current to 4.2V, 4.25V, 4.3V, 4.35V, 4.4V, 4.45V, 4.5V, 4.55V, 4.6V, 4.65V with a C charging current. It is then charged at constant voltage until the charge-discharge rate reaches 0.05 C and stop charging. After that, the electrochemical device 310 is discharged to 3.0V at a rate of 0.2 C. The aforementioned charge and discharge cycle is performed for 10 times. The electrochemical device 310 is disassembled to observe whether occurs lithium precipitation. The cut-off voltage of the maximum constant current charging stage when the electrochemical device 310 does not occur lithium precipitation is the charging limit voltage of the electrochemical device 310. As an example, if there is no lithium precipitation at 4.45V and there is lithium precipitation at 4.5V, then the charging limit voltage of the electrochemical device 310 is 4.45V.

The charging current a in the first and second methods is determined according to the coating weight of the negative electrode material of the electrochemical device 310. For the negative electrode coating weight being greater than 140 mg/1540.25 mm$^2$, a=1 C; for the negative electrode coating weight being (120~140) mg/1540.25 mm$^2$, a=2 C; for the negative electrode coating weight being (105~120) mg/1540.25 mm$^2$, a=3 C; for the negative electrode coating weight being less than 105 mg/1540.25 mm$^2$, a=6 C.

If the amount of positive tabs (or negative tabs) of the electrochemical device 310 to be tested is multiple, the outer soft-coated aluminum-plastic film of the electrochemical device 310 can be opened from the bottom, and the positive tabs (or negative tabs) of the electrochemical device 310 are cut off by using tools such as ceramic scissors, leaving only one positive tab (or negative tab). There are multiple tabs while retaining the middle layer tabs, and the inner and outer tabs are cut off.

The above determination method of the charging voltage limit $U_0$ of the electrochemical device 310 is only exemplary, and does not limit the scope of the present application. If there are other methods that can determine the charging voltage limit $U_0$, it can also be used. It can be understood that, according to the actual application scenarios and specific configurations of the electrochemical device 310, the determination and selection of the charging current a in the first and second methods may be adjusted, and those skilled in the art can adjust the charging current value a according to the actual situation.

The constant voltage charging module 423 is used to control the charging device 200 to apply the second voltage value $U_2$ to the electrochemical device 310 to charge the electrochemical device 310, until the current of the electrochemical device 310 reaches the charging cut-off current value $I_0$.

In another embodiment, the acquisition module 421 may also acquire the value of the third charging current $I_3$ and the third voltage value $U_3$.

The constant current charging module 422 can also control the charging device 200 to charge the electrochemical device 310 with the third charging current $I_3$ until the voltage of the electrochemical device 310 reaches the third voltage value $U_3$.

Among them, the third charging current $I_3$ is less than the second current value $I_2$, and the third voltage value $U_3$ is greater than the second voltage value $U_2$.

In one of some embodiments, the third voltage value $U_3$ and the charging voltage limit $U_0$ of the electrochemical device 310 satisfy:

$$\frac{1}{448} \le \frac{(U_2 - U_0)}{U_0} \le \frac{3}{224}.$$

In another embodiment, the third voltage value $U_3$ and the charging voltage limit $U_0$ of the electrochemical device 310 satisfy $$\frac{1}{112} \le \frac{(U_2 - U_0)}{U_0} \le \frac{3}{224}.$$

In another embodiment, the constant voltage charging module 423 can also charge the electrochemical device through the third voltage value $U_3$ until the current of the electrochemical device reaches the charging cut-off current value $I_0$. Among them, the charging cut-off current value $I_0$ is less than the third charge current value $I_3$.

It can be understood that the various modules in some embodiments of the present application (for example, the charging and discharging module 221, the control module 222, the acquisition module 421, the constant current charging module 422, and the constant voltage charging module 423, etc.) can be implemented as software, firmware, hardware, and other appropriate combination.

In the hardware implementation, the division between functional modules mentioned in the above description does not necessarily correspond to the division of physical components; for example, a physical component may have multiple functions, or a function or step may be cooperatively implemented by several physical components. Some physical components or all physical components can be implemented as software executed by a processor, such as a central processing unit, a digital signal processor, or a microprocessor, or as hardware, or as an integrated circuit, such as an application specific integrated circuit.

Such a software may be distributed on a computer-readable medium, and the computer-readable medium may include a computer storage medium and a communication medium. As well known to those of ordinary skill in the art, the term "computer storage medium" includes volatile and non-volatile, removable and non-removable media implemented in any method or technique for storing information (such as computer-readable instructions, data structures, program modules, or other data). Computer storage media include, but are not limited to, Random Access Memory (RAM), Read-Only Memory (ROM), Electrically Erasable Programmable Read Only Memory (EEPROM), Flash Memory, Compact Disc Read-Only Memory (CD-ROM), Digital Video Disc (DVD), or other optical disk storage, magnetic cassettes, magnetic tapes, disk storage or other magnetic storage devices, or any other medium that can be used to store desired information and be accessed by a computer. In addition, it is well known to those of ordinary skill in the art that a communication medium usually comprises computer-readable instructions, data structures, program modules, or other data in a modulated data signal such as a carrier wave or other transmission mechanism, and may comprise any information delivery medium.

Charging Method

The charging method of the embodiment of the present application will be described below. The charging method can be controlled to charge and discharge by the first processor 220 in the charging device 200, or can be controlled to implement by the battery management system 400 in the electronic device 300, for example, the second processor 420 in the battery management system 400.

Figure 10:
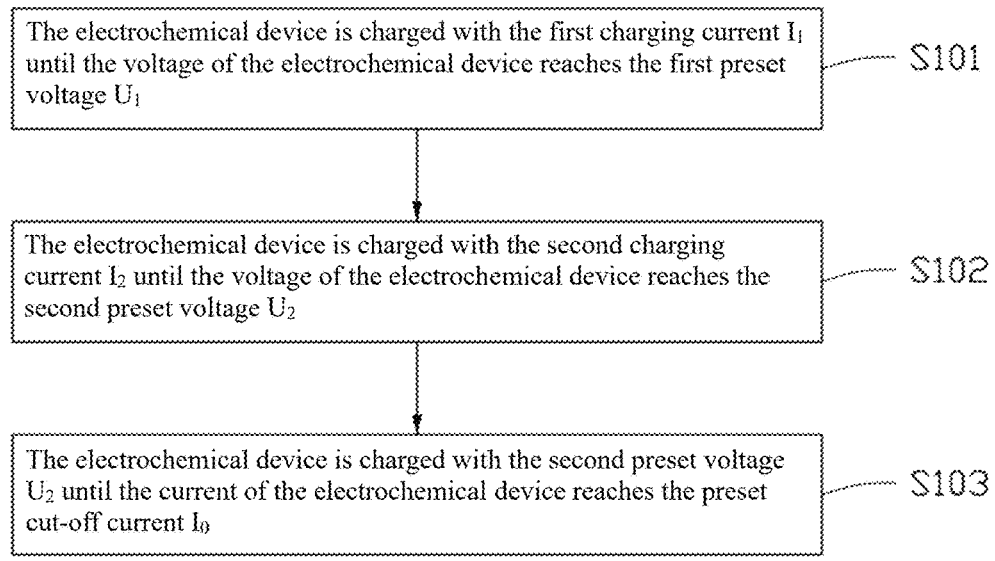
FIG. 10 is a flowchart of a charging method in an embodiment of the application.

FIG. 10 is a flowchart of a charging method according to an embodiment of the present application.

With reference to FIG. 10, the charging method comprises the following steps:

S101: the electrochemical device 310 is charged with a first current value (i.e., a first charging current) $I_1$, until the voltage of the electrochemical device 310 reaches a first voltage value (i.e., a first preset voltage) $U_1$.

In this embodiment, the first current value $I_1$ and the first voltage value $U_1$ can be set as necessary. The value of the first charging current $I_1$ is related to the charging rate of the electrochemical device 310, and the selected first voltage value $U_1$ is related to the system voltage $U_x$ of the electrochemical device 310.

S102: the electrochemical device 310 is charged with the second current value (i.e., the second charging current) $I_2$, until the voltage of the electrochemical device 310 reaches the second voltage value (i.e., the second preset voltage) $U_2$.

Among them, the second current value $I_2$ is less than the first current value $I_1$, and the second voltage value $U_2$ is greater than the first voltage value $U_1$.

In this embodiment, the second voltage value $U_2$ is the charging cut-off voltage. The second charging current $I_2$ and the second voltage value $U_2$ can be set as necessary. The value of the second charging current $I_2$ is related to the charging rate of the electrochemical device 310, and the selected second voltage value $U_2$ is related to the system voltage $U_x$ of the electrochemical device 310.

For example, for an electrochemical device 310 with a system voltage $U_x$=4.48 V and a charge rate of 1.0 C~3.0 C, the value of the second charging current $I_2$ is 0.5 C~2.5 C, and the selected second voltage value $U_2$ is 4.5 V~4.55 V. Among them, the selected second voltage value $U_2$ is preferably 4.51 V~4.53 V. Specifically, when the charging rate is 1.0 C, the value of the second charging current $I_2$ is 0.5 C~1.0 C, preferably 0.6 C~0.8 C. When the charging rate is 1.0 C~2.0 C, the value of the second charging current $I_2$ is 1.0 C~1.8 C, preferably 1.2 C~1.5 C. When the charging rate is 2.0 C~3.0 C, the value of the second charging current $I_2$ is 1.5 C~2.5 C, preferably 1.7 C~2.2 C. For electrochemical devices 310 of other voltage systems, for example, the system voltage $U_x$=(4.48+x) V, where x is any real number, the selected second voltage value $U_2$ satisfies: (4.5+x)

V<$U_2$<(4.55+x) V. In one of some embodiments, the second charging current $I_2$ is 1.2 C, and the second voltage value $U_2$ is 4.53 V.

In one of some embodiments, the second voltage value $U_2$ and the charging voltage limit $U_0$ of the electrochemical device 310 satisfy:

$$\frac{1}{448} \leq \frac{(U_2 - U_0)}{U_0} \leq \frac{3}{224}.$$

In the embodiment of the present application, the charging voltage limit $U_0$ is determined according to the system voltage $U_x$ of the electrochemical device 310, and the system voltage $U_x$ is determined according to the material characteristics of the electrochemical device 310.

It is noted that the application does not limit the system voltage $U_x$ of the electrochemical device 310. In other words, the charging method of the embodiment of the present application is also applicable to electrochemical devices 310 of other voltage systems.

In one of some embodiments, the charging voltage limit $U_0$ and the system voltage $U_x$ satisfy:

$$\frac{90}{100} \leq \frac{U_0}{U_x} \leq \frac{95}{100}.$$

For example, for an electrochemical device 310 with a system voltage $U_x$=4.8V, the charging voltage limit $U_0$ may be 4.32 V~4.56 V.

In this embodiment, the electrochemical device 310 is charged at two constant current stages by using a multi-stage constant current charging method. The second voltage value $U_2$ is greater than the charging voltage limit $U_0$, which can extend the charging time at the constant current stage.

In another embodiment, the second voltage value $U_2$ and the charging voltage limit $U_0$ of the electrochemical device 310 satisfy:

$$\frac{1}{112} \leq \frac{(U_2 - U_0)}{U_0} \leq \frac{3}{224}.$$

In one of some embodiments, the charging method further comprises the following steps:

S103: the electrochemical device 310 is charged with the second voltage value (i.e., the second preset voltage) $U_2$, until the current of the electrochemical device 310 reaches the charging cut-off current value (i.e., the preset cut-off current) $I_0$.

Among them, the charging cut-off current value $I_0$ is less than the second current value $I_2$.

In the embodiment of the present application, the charging cut-off current value $I_0$ can be set as necessary. In one of some embodiments, when the actual full charge capacity of the electrochemical device 310 is equal to the full charge capacity of some multi-stage constant current charging, the cut-off current at this time can be obtained. The charging cut-off current value $I_0$ can be obtained according to the cut-off current, and the obtained charging cut-off current value $I_0$ is greater than the value of the cut-off current.

In one of some embodiments, the charging cut-off current value $I_0$ is 0.16 C.

In this embodiment, the electrochemical device 310 is charged with a second voltage value $U_2$ greater than the charging voltage limit $U_0$ by using a constant voltage charging method, and the charging cut-off current value $I_0$ is less than the second current value $I_2$. This can shorten the charging time of the constant voltage stage, thereby shortening the running time of the positive electrode at a high potential.

Figure 11:
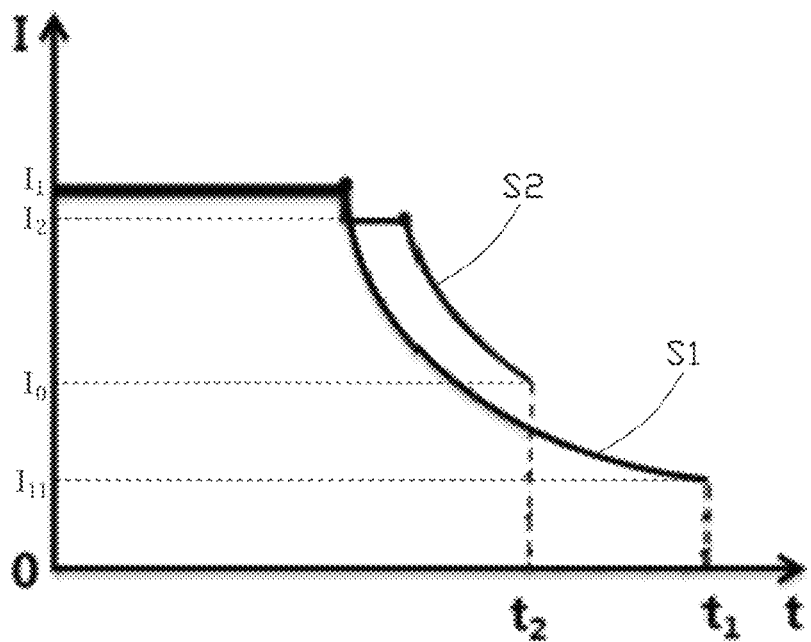
FIG. 11 is a schematic diagram of a charging method in an embodiment of the application.

FIG. 11 is a graph of a charging method according to an embodiment of the present application.

With reference to FIG. 11, the S1 curve indicates that the electrochemical device 310 is charged by a single-stage constant current method, and the S2 curve indicates that the electrochemical device 310 is charged by a two-stage constant current method (that is, the charging method described in FIG. 10 of this application).

Among them, the method of a single-stage constant current comprises the following steps:

(1) The electrochemical device 310 is charged with the first charging current $I_1$ until the voltage of the electrochemical device 310 reaches the charging voltage limit $U_0$.

(2) The electrochemical device 310 is charged with the charging voltage limit $U_0$ until the current of the electrochemical device 310 reaches the charging cut-off current $I_{11}$.

Among them, the charging cut-off current $I_{11}$ is greater than the charging cut-off current value $I_0$ in the above-mentioned charging method of the embodiment in the present application, to ensure that the electrochemical device 310 being charged in a single-stage constant current mode and the electrochemical device 310 being charged in a two-stage constant current mode (that is, the above-mentioned charging method of the embodiment in the application) have the same charging capacity.

In the case that the electrochemical device 310, the first charging current $I_1$ and the charging capacity are the same, the charging time for the electrochemical device 310 to be charged in a single-stage constant current mode is $t_1$, and the charging time for the electrochemical device 310 to be charged in two-stage constant current mode (that is, the above-mentioned charging method of the embodiment in the application) is $t_2$. It can be seen from FIG. 11 that, compared with the multi-stage (for example, two-stage) constant current mode (i.e., the charging method of the embodiment in the application), in the case of the single-stage constant current mode, the charging time at the constant current stage is shorter, and the charging time at the constant voltage stage is longer. The positive electrode stays under high voltage for a long time, the positive electrode material is unstable, and the cycle performance of the electrode assembly 500 is poor.

Figure 12:
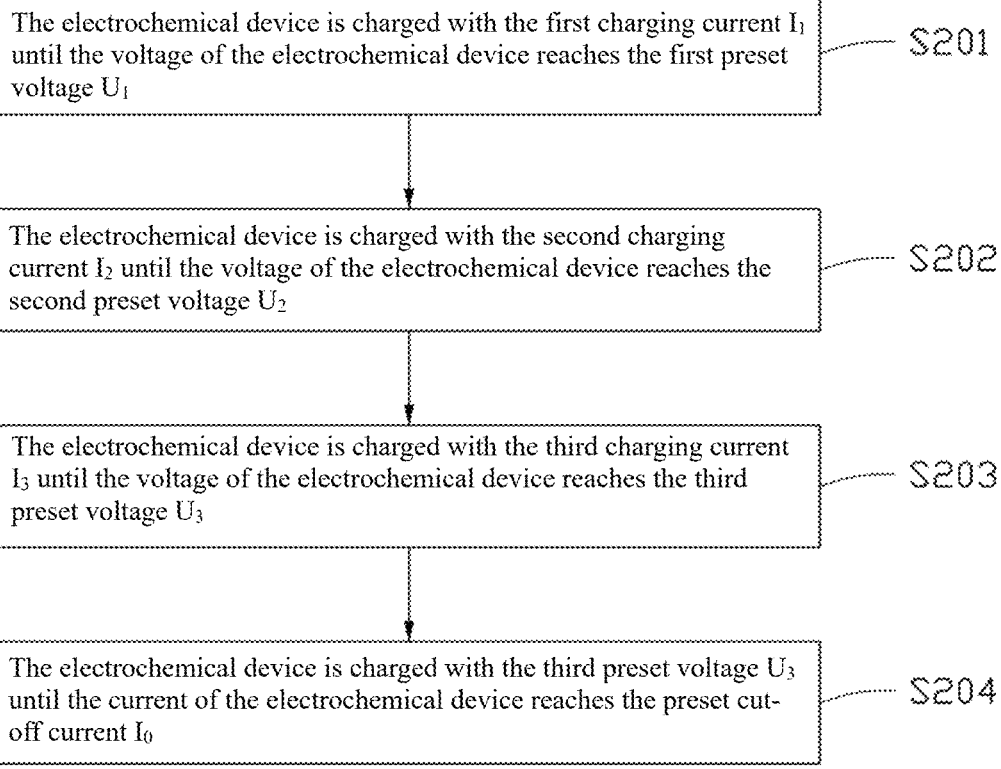
FIG. 12 is a flowchart of a charging method in another embodiment of the application.

FIG. 12 is a flowchart of a charging method according to another embodiment of the present application.

With reference to FIG. 12, the charging method comprises the following steps:

S201: the electrochemical device 310 is charged with the first current value (i.e., the first charging current) $I_1$, until the voltage of the electrochemical device 310 reaches the first voltage value (i.e., the first preset voltage) $U_1$.

In this embodiment, the first current value $I_1$ and the first voltage value $U_1$ can be set as necessary. In one of some embodiments, the first charging current $I_1$ is 1.5 C, and the first voltage value $U_1$ is 4.2 V.

S202: the electrochemical device 310 is charged with the second current value (i.e., the second charging current) $I_2$, until the voltage of the electrochemical device 310 reaches the second voltage value (i.e., the second preset voltage) $U_2$.

Among them, the second current value $I_2$ is less than the first current value $I_1$, and the second voltage value $U_2$ is greater than the first voltage value $U_1$.

In this embodiment, the second charging current $I_2$ and the second voltage value $U_2$ can be set as necessary. In one of some embodiments, the second charging current $I_2$ is 1.3 C, and the second voltage value $U_2$ is 4.4 V.

S203: the electrochemical device 310 is charged with the third current value (i.e., the third charging current) $I_3$, until the voltage of the electrochemical device 310 reaches the third voltage value (ie, the third preset voltage) $U_3$.

Among them, the third charging current $I_3$ is less than the second current value $I_2$, and the third voltage value $U_3$ is greater than the second voltage value $U_2$.

In this embodiment, the third voltage value $U_3$ is the charging cut-off voltage. The third charging current $I_3$ and the third voltage value $U_3$ can be set as necessary. The value of the third charging current $I_3$ is related to the charging rate of the electrochemical device 310, and the selected third voltage value $U_3$ is related to the system voltage $U_x$ of the electrochemical device 310.

For example, for an electrochemical device 310 with a system voltage $U_x$=4.48V and a charging rate of 1.0 C~3.0 C, the value of the third charging current $I_3$ is 0.5 C~2.5 C, and the selected third voltage value $U_3$ is 4.5 V~4.55 V. Among them, the selected third voltage value $U_3$ is preferably 4.51 V~4.53 V. Specifically, when the charging rate is 1.0 C, the value of the third charging current $I_3$ is 0.5 C~1.0 C, preferably 0.6 C~0.8 C. When the charging rate is 1.0 C~2.0 C, the value of the third charging current $I_3$ is 1.0 C~1.8 C, preferably 1.2 C~1.5 C. When the charging rate is 2.0 C~3.0 C, the value of the third charging current $I_3$ is 1.5 C~2.5 C, preferably 1.7 C~2.2 C.

For electrochemical devices 310 of other voltage systems, for example, the system voltage $U_x$=(4.48+x) V, where x is any real number, the selected third voltage value $U_3$ satisfies: (4.5+x) V<$U_2$<(4.55+x) V.

In one of some embodiments, the third charging current $I_3$ is 1.0 C, and the third voltage value $U_3$ is 4.53 V.

In one of some embodiments, the third voltage value $U_3$ and the charging voltage limit $U_0$ of the electrochemical device 310 satisfy:

$$\frac{1}{448} \leq \frac{(U_2 - U_0)}{U_0} \leq \frac{3}{224}.$$

In this embodiment, the electrochemical device 310 is charged at three constant current stages by using the multi-stage constant current charging method. The third voltage value $U_3$ is greater than the charging voltage limit $U_0$, which can extend the charging time at the constant current stage.

In another embodiment, the third voltage value $U_3$ and the charging voltage limit $U_0$ of the electrochemical device 310 satisfy:

$$\frac{1}{112} \leq \frac{(U_2 - U_0)}{U_0} \leq \frac{3}{224}.$$

In one of some embodiments, the charging method further comprises the following steps:

S204: the electrochemical device 310 is charged with the third voltage value (i.e., the third preset voltage) $U_3$, until the current of the electrochemical device 310 reaches the charging cut-off current value (i.e., the preset cut-off current) $I_0$.

Among them, the charging cut-off current value $I_0$ is less than the third charging current $I_3$.

In this embodiment, the electrochemical device 310 is charged with a third voltage value $U_3$ greater than the charging voltage limit $U_0$ by using a constant voltage charging method, and the charging cut-off current value $I_0$ is less than the third charging current $I_3$. This can shorten the charging time at the constant voltage stage, thereby shortening the running time of the positive electrode at a high potential.

In this application, it can be understood that the higher the cut-off voltage at the constant current charging stage, the higher the charging voltage at the constant voltage charging stage, and the greater the cut-off current at the constant voltage charging stage. In some embodiments of the application, the cut-off current $I_0$ is no less than 0.1 C. Specifically, when the second cut-off voltage satisfies $$\frac{1}{112} \leq \frac{(U_2 - U_0)}{U_0} \leq \frac{3}{224},$$

or when the third cut-off voltage satisfies $$\frac{1}{112} \leq \frac{(U_3 - U_0)}{U_0} \leq \frac{3}{224},$$

the cut-off current $I_0$ is no less than 0.1 C.

Some specific examples and comparative examples are listed below to better explain the present application, in which a lithium-ion battery is used as an example. The following examples are only used as schematic illustrations, and should not limit the protection scope of the present application.

Method of Preparing the Lithium-Ion Battery

The methods of preparing the battery in each of the examples and the comparative examples are substantially identical, except for the amount of positive tabs and negative tabs.

Preparation of the positive electrode plate: an aluminum foil was used as the positive electrode current collector of the positive electrode, and the positive electrode active material lithium cobaltate, the conductive agent conductive carbon black, and polyvinylidene fluoride were dissolved in N-methylpyrrolidone (NMP) solution at a weight ratio of 97.8:1.4:0.8, to form a slurry of the positive electrode active material layer. This slurry was coated on the positive electrode current collector with a coating thickness of 80 μm, to obtain the positive electrode active material layer. The positive electrode plate was then obtained after drying, cold pressing, and cutting.

Preparation of the negative electrode plate: graphite M, sodium carboxymethyl cellulose (CMC) and the binder styrene-butadiene rubber were dissolved in deionized water at a weight ratio of 97.7:1.3:1 to form a slurry. A copper foil with a thickness of 10 μm was used as the current collector of the negative electrode plate, and the slurry was coated on the current collector of the negative electrode with a coating thickness of 80 μm, to obtain the negative electrode active material layer. The negative electrode plate was obtained after drying and cutting.

Preparation of the separator: the separator substrate was 8 μm thick polyethylene (PE), and 2 μm alumina ceramic layers were coated on both sides of the separator substrate. Finally, 2.5 mg/cm² of the binder polyvinylidene fluoride (PVDF) was coated on both sides of the ceramic layer, and dried.

Preparation of the liquid electrolyte: in an environment with water content of less than 10 ppm, $LiPF_6$ was added to a non-aqueous organic solvent (ethylene carbonate (EC): propylene carbonate (PC): diethyl carbonate (DEC) and dimethyl carbonate (DMC)=1:1:1:1, weight ratio) to obtain a mixture, in which the concentration of $LiPF_6$ was 1 mol/L. The mixture was evenly mixed to obtain the liquid electrolyte.

Preparation of the lithium-ion battery: the positive electrode plate, the separator, and the negative electrode plate were stacked in sequenceso that the separator was located between the positive electrode plate and the negative electrode plate for isolation, then wound to obtain the electrode assembly. The electrode assembly was placed in the outer packaging aluminum-plastic film. After removing moisture at 80° C., injection of the above-mentioned electrolyte was carried out and packaging. After forming, degassing, trimming and other processes, the lithium-ion battery was obtained.

Charging Method

Two-Stage Constant Current Charging Method

The lithium-ion battery was charged with the first charging current $I_1$=1.5 C until the voltage of the lithium-ion battery reached the first voltage value $U_1$=4.2 V; the lithium-ion battery was charged with the second charging current $I_2$=1.2 C until the voltage of the lithium-ion battery reached the second voltage value $U_2$=4.49 V; and the lithium-ion battery was charged with the second voltage value $U_2$=4.49 V until the current of the lithium-ion battery reached the charging cut-off current value $I_0$=0.16 C.

Three-Stage Constant Current Charging Method

The lithium-ion battery was charged with the first charging current $I_1$=1.5 C until the voltage of the lithium-ion battery reached the first voltage value $U_1$=4.2 V; the lithium-ion battery was charged with the second charging current $I_2$=1.3 C until the voltage of the lithium-ion battery reached the second voltage value $U_2$=4.4 V; the lithium-ion battery was charged with the third charging current $I_3$=1.0 C until the voltage of the lithium-ion battery reached the third voltage value $U_3$=4.53 V; the lithium-ion battery was charged with the third voltage value $U_3$=4.53 V until the current of the lithium-ion battery reached the charging cut-off current value $I_0$=0.16 C.

Single-Stage Constant Current Charging Method

The lithium-ion battery was charged with the first charging current $I_1$=1.5 C until the voltage of the lithium-ion battery reached the charging voltage limit $U_0$=4.48 V; and the lithium-ion battery was charged with the charging voltage limit $U_0$=4.48 V until the current of the lithium-ion battery reached the charging cut-off current $I_0$=0.05 C.

Test Method (1) The amount of charge and discharge cycles at 55° C. and 80% capacity retention rate A 5V 30 A device with the model BTS4000 produced by Shenzhen Xinweier Electronics Factory was used to carry out the charging cycle test on the lithium-ion battery. The control environment temperature was 55° C., and the test method included the following steps:

The preset charging method was used to charge the lithium-ion battery. Among them, the preset charging method included a single-stage constant current mode or a multi-stage (for example, two-stage) constant current mode (i.e., the charging method corresponding to the examples of the present application). The charging time was recorded when the lithium-ion battery reached a fully charged state. Among them, the fully charged state refers to the state where the remaining capacity of the lithium-ion battery reaches the preset full charge threshold (95%). The lithium-ion battery was discharged with a preset discharge rate (0.7 C) until the voltage of the lithium-ion battery reached the discharge cut-off voltage (3 V). The above-mentioned steps were repeated, i.e., charge and discharge cycles were carried out. When the capacity retention rate of the lithium-ion battery reached a preset threshold (for example, 80%), the amount of charge and discharge cycles was recorded.

The capacity retention rate of lithium-ion batteries was calculated using the following method. At the end of the first charge-discharge cycle of the lithium ion, the obtained capacity was the first discharge capacity of the lithium-ion battery. For a certain cycle, the cycle capacity retention rate of the electrode assembly was calculated by the following equation: cycle capacity retention rate=discharge capacity after the cycle/discharge capacity of the first cycle×100%.

(2) Testing the temperature of the positive tab of the lithium-ion battery. A multi-channel thermometer was used for temperature testing, and the sensor was placed on the surface of the lithium-ion battery near the positive tab.

It can be understood that in the above-mentioned test method, the value of the preset discharge rate and the value of the discharge cut-off voltage can be set as necessary. In one of some embodiments, the preset discharge rate is less than or equal to 1.5 C.

Table 1 is the test method of the charging cycle test. It can be seen from Table 1 that both Examples 1-19 and Comparative Example 2 use a two-stage constant current charging method, Examples 20-24 all use a three-stage constant current charging method, and Comparative Example 1 and Comparative Example 3 both use a single-stage constant current charging method. The difference between Examples 1-6 (or Examples 7-12, or Examples 13-16, or Examples 17-19) is that the value of the charging cut-off voltage minus the charging voltage limit $U_0$ is different (for example, 10/20/30/40/50/60 mV). The difference between Examples 1, 7, 13, 17 (or Examples 2, 8, 14, or Examples 3, 9, 15, 18, or Examples 5, 11, 16, 19 and Comparative Example 2, or Examples 20-24, or Comparative Example 1 and Comparative Example 3) is that the amount ratio of the positive tab 521 and the negative tab 511 is different (for example, 3:2, or 2:1, or 5:2, or 3:1, or 7:2, or 4:1, or 1:1).

TABLE 1

Test method of charging cycle test

| | Charging method (single-stage constant current/ two-stage constant current/three-stage constant current) | The charging cut-off voltage minus the charging voltage limit $U_0$ (mV) | Amount of positive tabs | Amount of negative tabs | The ratio of the amount of positive tabs to negative tabs |
|---|---|---|---|---|---|
| Ex. 1 | Two-stage constant current | 10 | 3 | 2 | 3:2 |
| Ex. 2 | Two-stage constant current | 20 | 3 | 2 | 3:2 |
| Ex. 3 | Two-stage constant current | 30 | 3 | 2 | 3:2 |
| Ex. 4 | Two-stage constant current | 40 | 3 | 2 | 3:2 |
| Ex. 5 | Two-stage constant current | 50 | 3 | 2 | 3:2 |
| Ex. 6 | Two-stage constant current | 60 | 3 | 2 | 3:2 |
| Ex. 7 | Two-stage constant current | 10 | 2 | 1 | 2:1 |
| Ex. 8 | Two-stage constant current | 20 | 2 | 1 | 2:1 |
| Ex. 9 | Two-stage constant current | 30 | 2 | 1 | 2:1 |
| Ex. 10 | Two-stage constant current | 40 | 2 | 1 | 2:1 |
| Ex. 11 | Two-stage constant current | 50 | 2 | 1 | 2:1 |
| Ex. 12 | Two-stage constant current | 60 | 2 | 1 | 2:1 |
| Ex. 13 | Two-stage constant current | 10 | 5 | 2 | 5:2 |
| Ex. 14 | Two-stage constant current | 20 | 5 | 2 | 5:2 |
| Ex. 15 | Two-stage constant current | 30 | 5 | 2 | 5:2 |
| Ex. 16 | Two-stage constant current | 50 | 5 | 2 | 5:2 |
| Ex. 17 | Two-stage constant current | 10 | 3 | 1 | 3:1 |
| Ex. 18 | Two-stage constant current | 30 | 3 | 1 | 3:1 |
| Ex. 19 | Two-stage constant current | 50 | 3 | 1 | 3:1 |
| Ex. 20 | Three-stage constant current | 50 | 2 | 1 | 2:1 |
| Ex. 21 | Three-stage constant current | 50 | 5 | 2 | 5:2 |
| Ex. 22 | Three-stage constant current | 50 | 3 | 1 | 3:1 |
| Ex. 23 | Three-stage constant current | 50 | 7 | 2 | 7:2 |
| Ex. 24 | Three-stage constant current | 50 | 4 | 1 | 4:1 |
| Com. Ex. 1 | Single-stage constant current | 0 | 1 | 1 | 1:1 |
| Com. Ex. 2 | Two-stage constant current | 50 | 1 | 1 | 1:1 |
| Com. Ex. 3 | Single-stage constant current | 0 | 2 | 1 | 2:1 |

Results and Analysis

Table 2 is the test result of the charging cycle test. It can be seen from Table 2 that compared with Comparative Examples 1-3, Examples 1-24 have improved cycle performance, charging speed or temperature rise of the lithium-ion battery. When single-stage constant current charging method is used, the charging time at the constant current stage is shorter, the charging time at the constant voltage stage is longer, the positive electrode is under high voltage for a longer time, the positive electrode material is unstable, and the cycle performance of the lithium-ion battery is poor. However, when the multi-stage constant current charging method is used, the temperature rise problem of the lithium-ion battery is significantly improved. In Example 21, the cycle performance, charging speed, and temperature rise of the lithium-ion battery are better improved. In Example 21, the cycle performance of the lithium-ion battery is improved, the charging speed is shortened, and the decrease in temperature rise is more obvious.

TABLE 2

Test results of charging cycle test

| | Amount of charge and discharge cycles at 55° C., 80% capacity retention rate | Full charge time (min) | Temperature rise relative to 25° C. |
|---|---|---|---|
| Ex. 1 | 160 | 55.6 | 15.6 |
| Ex. 2 | 180 | 55.2 | 15.1 |
| Ex. 3 | 220 | 54.5 | 15 |
| Ex. 4 | 260 | 53 | 15.1 |
| Ex. 5 | 320 | 52 | 15.2 |
| Ex. 6 | 310 | 51.8 | 15.1 |
| Ex. 7 | 200 | 51.5 | 14.5 |
| Ex. 8 | 230 | 55.3 | 14.3 |
| Ex. 9 | 265 | 55.1 | 14.2 |
| Ex. 10 | 330 | 54.2 | 14.5 |
| Ex. 11 | 400 | 52.5 | 14.1 |
| Ex. 12 | 380 | 51.2 | 14.4 |
| Ex. 13 | 260 | 51.2 | 13.9 |
| Ex. 14 | 300 | 51 | 13.7 |
| Ex. 15 | 380 | 50.5 | 13.8 |
| Ex. 16 | 520 | 50 | 14 |
| Ex. 17 | 285 | 51 | 13.5 |
| Ex. 18 | 340 | 50.3 | 13.3 |
| Ex. 19 | 420 | 49.9 | 13.6 |
| Ex. 20 | 450 | 50 | 14.7 |
| Ex. 21 | 550 | 48.2 | 13.2 |
| Ex. 22 | 530 | 49.8 | 13.5 |
| Ex. 23 | 500 | 50 | 13.5 |
| Ex. 24 | 480 | 51 | 13 |
| Com. Ex. 1 | 150 | 59.5 | 16 |
| Com. Ex. 2 | 300 | 54.5 | 15.1 |
| Com. Ex. 3 | 210 | 58.5 | 14.8 |

It can be determined from the above-mentioned experimental design that this application controls the amount n of positive tabs to be greater than the amount m of negative tabs by adjusting the amount of positive tabs and that of negative tabs, and increase the charging voltage and reduce the charging cut-off current by combining with the multi-stage constant current charging, which can improve the cycle performance of the lithium-ion battery and reduce the temperature rise of the lithium-ion battery.

The examples of the application are described in detail above in conjunction with the accompanying drawings. However, the application is not limited to the above-mentioned examples, and within the scope of knowledge possessed by those of ordinary skill in the art, various changes can be made by them without departing from the purpose of this application.

The invention claimed is:

1. An electrochemical device, comprising:
a negative electrode plate, a positive electrode plate, a separator, m negative tabs and n positive tabs;
the separator is provided between the negative electrode plate and the positive electrode plate;
the m negative tabs are electrically connected to the negative electrode plate;
m is a positive integer greater than or equal to 1;
the n positive tabs are electrically connected to the positive electrode plate;
n is a positive integer greater than 1;
n>m; and
the electrochemical device is configured to be charged with a multi-stage constant current charging method;
wherein,
the electrochemical device is configured to be
charged with a first charging current $I_1$ until a voltage of the electrochemical device reaches a first voltage $U_1$;
charged with a second charging current $I_2$ until the voltage of the electrochemical device reaches a second voltage $U_2$;

$I_2 < I_1$;

$U_2 > U_1$;

charged with the second voltage $U_2$ until a current of the electrochemical device reaches a charging cut-off current $I_0$;
wherein,
a charging voltage limit of the electrochemical device is $U_0$; and $$\frac{1}{448} \leq \frac{(U_2 - U_0)}{U_0} \leq \frac{3}{224}.$$

2. The electrochemical device of claim 1, wherein, $$1 < \frac{n}{m} \leq 4.$$

3. The electrochemical device of claim 2, wherein, $$2 \leq \frac{n}{m} \leq 3.$$

4. The electrochemical device of claim 1, wherein $I_0$ is no less than 0.1 C.

5. The electrochemical device of claim 1, wherein, $$\frac{1}{112} \leq \frac{(U_2 - U_0)}{U_0} \leq \frac{3}{224}.$$

6. A method of charging the electrochemical device of claim 1, wherein the method is a method of a multi-stage constant current charging;
wherein the method comprises:
charge the electrochemical device with a charging current having a first current value $I_1$ until the voltage of the electrochemical device reaches the first voltage value $U_1$;
charge the electrochemical device with a charging current having a second current value $I_2$ until the voltage of the electrochemical device reaches a second voltage value $U_2$,
wherein the second current value $I_2$ is less than the first current value $I_1$, and the second voltage value $U_2$ is greater than the first voltage value $U_1$; and
applying to the electrochemical device a charging voltage having the second voltage value $U_2$ until the current of the electrochemical device reaches a charging cut-off current value $I_0$;
wherein a charging voltage limit of the electrochemical device is $U_0$, and the second voltage value $U_2$ and the charging voltage limit $U_0$ satisfy:

$$\frac{1}{448} \leq \frac{(U_2 - U_0)}{U_0} \leq \frac{3}{224}.$$

7. The charging method of claim 6, wherein $I_0$ is no less than 0.1 C.

8. The charging method of claim 6, wherein the second voltage value $U_2$ and the charging voltage limit $U_0$ satisfy:

$$\frac{1}{112} \leq \frac{(U_2 - U_0)}{U_0} \leq \frac{3}{224}.$$

9. An electrochemical device, comprising:
a negative electrode plate, a positive electrode plate, a separator, m negative tabs and n positive tabs;
the separator is provided between the negative electrode plate and the positive electrode plate;
the m negative tabs are electrically connected to the negative electrode plate;
m is a positive integer greater than or equal to 1;
the n positive tabs are electrically connected to the positive electrode plate;
n is a positive integer greater than 1;
n>n; and
the electrochemical device is configured to be charged with a multi-stage constant current charging method;
wherein,
the electrochemical device is configured to be:
charged with a first charging current $I_1$ until a voltage of the electrochemical device reaches a first voltage $U_1$;
charged with a second charging current $I_2$ until the voltage of the electrochemical device reaches a second voltage $U_2$;

$I_2 < I_1$;

$U_2 > U_1$;

charged with a third charging current $I_3$ until the voltage of the electrochemical device reaches a third voltage $U_3$;

$I_3 < I_2$;

$U_3 > U_2$; and charged with the third voltage $U_3$ until a current of the electrochemical device reaches a charging cut-off current $I_0$;

wherein, a charging voltage limit of the electrochemical device is $U_0$; and $$\frac{1}{448} \le \frac{(U_3 - U_0)}{U_0} \le \frac{3}{224}.$$

10. The electrochemical device of claim 9, wherein $I_0$ is no less than 0.1 C.

11. A method of charging the electrochemical device of claim 9, wherein the charging method comprises:
charge the electrochemical device with a charging current having the first current value $I_1$ until the voltage of the electrochemical device reaches the first voltage value $U_1$;
charge the electrochemical device with a charging current having the second current value $I_2$ until the voltage of the electrochemical device reaches the second voltage value $U_2$, wherein the second current value $I_2$ is less than the first current value $I_1$, and the second voltage value $U_2$ is greater than the first voltage value $U_1$;
charge the electrochemical device with a charging current having the third current value $I_3$ until the voltage of the electrochemical device reaches the third voltage value $U_3$, wherein the third current value $I_3$ is less than the second current value $I_2$, and the third voltage value $U_3$ is greater than the second voltage value $U_2$; and
apply to the electrochemical device with a charging voltage having the third voltage value $U_3$ until the current of the electrochemical device reaches the charging cut-off current value $I_0$;
wherein a charging voltage limit of the electrochemical device is $U_0$, and the third voltage value $U_3$ and the charging voltage limit $U_0$ satisfy:

$$\frac{1}{448} \le \frac{(U_3 - U_0)}{U_0} \le \frac{3}{224}.$$

12. The charging method of claim 11, wherein $I_0$ is no less than 0.1 C.

13. The charging method of claim 11, wherein the third voltage value $U_3$ and the charging voltage limit $U_0$ satisfy:

$$\frac{1}{112} \le \frac{(U_3 - U_0)}{U_0} \le \frac{3}{224}.$$

* * * * *